(12) United States Patent
Rao et al.

(10) Patent No.: US 12,498,677 B2
(45) Date of Patent: Dec. 16, 2025

(54) MITIGATING REALITY GAP THROUGH TRAINING A SIMULATION-TO-REAL MODEL USING A VISION-BASED ROBOT TASK MODEL

(71) Applicant: GOOGLE LLC, Mountain View, CA (US)

(72) Inventors: Kanishka Rao, Santa Clara, CA (US); Chris Harris, Los Altos, CA (US); Julian Ibarz, Mountain View, CA (US); Alexander Irpan, Palo Alto, CA (US); Seyed Mohammad Khansari Zadeh, San Carlos, CA (US); Sergey Levine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 511 days.

(21) Appl. No.: 17/767,675

(22) PCT Filed: May 15, 2020

(86) PCT No.: PCT/US2020/033257
§ 371 (c)(1),
(2) Date: Apr. 8, 2022

(87) PCT Pub. No.: WO2021/096561
PCT Pub. Date: May 20, 2021

(65) Prior Publication Data
US 2024/0118667 A1    Apr. 11, 2024

Related U.S. Application Data

(60) Provisional application No. 62/704,319, filed on May 4, 2020, provisional application No. 62/936,290, filed on Nov. 15, 2019.

(51) Int. Cl.
B25J 9/00    (2006.01)
B25J 9/16    (2006.01)
(Continued)

(52) U.S. Cl.
CPC ........ G05B 13/0265 (2013.01); B25J 9/1605 (2013.01); B25J 9/163 (2013.01); B25J 9/1697 (2013.01); B25J 19/023 (2013.01)

(58) Field of Classification Search
CPC ..... G05B 13/0265; B25J 9/1605; B25J 9/163; B25J 9/1697; B25J 19/023
See application file for complete search history.

(56) References Cited

U.S. PATENT DOCUMENTS

2014/0371907 A1    12/2014    Passot et al.
2018/0349527 A1    12/2018    Li
(Continued)

FOREIGN PATENT DOCUMENTS

DE    202017106132    11/2017
EP    3534230    9/2019
(Continued)

OTHER PUBLICATIONS

James, S. et al., "Sim-To-Real via Sim-To-Sim: Data-Efficient Robotic Grasping via Randomized-To-Canonical Adaptation Networks;" 2019 IEEE/CVF Conference on Computer Vision and Pattern Recognition (CVPR); 11 pages; Jun. 15, 2019.
(Continued)

*Primary Examiner* — Truc M Do
(74) *Attorney, Agent, or Firm* — Gray Ice Higdon

(57) ABSTRACT

Implementations disclosed herein relate to mitigating the reality gap through training a simulation-to-real machine learning model ("Sim2Real" model) using a vision-based robot task machine learning model. The vision-based robot task machine learning model can be, for example, a rein-
(Continued)

forcement learning ("RL") neural network model (RL-network), such as an RL-network that represents a Q-function.

19 Claims, 9 Drawing Sheets

(51) Int. Cl.
  *B25J 19/02* (2006.01)
  *G05B 13/02* (2006.01)

(56) References Cited

U.S. PATENT DOCUMENTS

| | | | |
|---|---|---|---|
| 2019/0084151 A1* | 3/2019 | Bai | B25J 9/1697 |
| 2019/0228495 A1* | 7/2019 | Tremblay | B25J 9/1661 |
| 2021/0201183 A1* | 7/2021 | Natarajan | G06N 3/008 |
| 2021/0237266 A1* | 8/2021 | Kalashnikov | B25J 9/1612 |

FOREIGN PATENT DOCUMENTS

| | | |
|---|---|---|
| JP | 2018043338 | 3/2018 |
| KR | 20190103103 | 9/2019 |
| WO | 2018053187 | 3/2018 |

OTHER PUBLICATIONS

Zhu, J. et al., "Unpaired Image-to-Image Translation Using Cycle-Consistent Adversarial Networks;" Cornell University, arXiv.org, arXiv:1703.10593v1; 18 pages; Mar. 30, 2017.
Bousmalis, K et al., "Using Simulation and Domain Adaptation to Improve Efficiency of Deep Robotic Grasping;" 2018 IEEE International Conference on Robotics and Automation (ICRA); 9 pages.
European Patent Office; International Search Report and Written Opinion of PCT Ser. No. PCT/US2020/033257; 15 pages; Sep. 10, 2020.
Bousmalis, K. et al., "Unsupervised Pixel-Level Domain Adaptation With Generative Adversarial Networks;" 2017 IEEE Conference on Computer Vision and Pattern Recognition (CVPR); 15 pages.
Brock, A. et al., "Large Scale GAN Training For High Fidelity Natural Image Synthesis;" Cornell University, arXiv.org, arXiv:1809.11096v1; 29 pages; Sep. 28, 2018.
Chu, C. et al., "CycleGAN, a Master of Steganography;" Cornell University, arXiv.org, arXiv:1712.02950v2; 6 pages; Dec. 16, 2017.
Goodfellow, I. et al., "Generative Adversarial Nets;" In Advances in Neural Information Processing Systems; 9 pages; 2014.
Goodfellow, I. et al. "Generative Adversarial Networks;" Cornell University, arXiv.org, arXiv:1406.2661; 9 pages; Jun. 10, 2014.
Hoffman, J. et al., "cyCADA: Cycle-Consistent Adversarial Domain Adaptation;" Cornell University, arXiv.org, arXiv:1711.03213v3; 15 pages; Dec. 29, 2017.
Hua, X. et al., "Unsupervised Cross-Domain Image Generation;" http://cs229.stanford.edu/proj2017/final-reports/5241608.pdf; 6 pages; 2017.
James, S. et al., "Task-Embedded Control Networks for Few-Shot Imitation Learning;" Cornell University, arXiv.org, arXiv:1810.03237v1; 13 pages; Oct. 8, 2018.
James, S. et al., "Transferring End-To-End Visuomotor Control From Simulation To Real World For A Multi-Stage Task;" Cornell University, arXiv.org, arXiv:1707.02267;10 pages; Oct. 17, 2017.
Kalashnikov, D. et al.; Scalable Deep Reinforcement Learning for Vision-Based Robotic Manipulation; 2nd Conference on Robot Learning (CoRL 2018); Switzerland; p. 1-23.
Lenz, I. et al. "Deep Learning for Detecting Robotic Grasps." In Proceedings of Robotics: Science and Systems, Berlin, Germany, Jun. 2013; 8 pages.
Levine et al.; Learning Hand-eye Cordination for Robotic Grasping with Deep Learning and Large-scale Data Collection; International Journal of Robotics Research; XP055400236; 12 Pages; US; dated Apr. 2, 2016.
Mahler, J. et al., "Dex-Net 2.0: Deep Learning to Plan Robust Grasps with Synthetic Point Clouds and Analytic Grasp Metrics;" Robotics: Science and Systems; 10 pages; 2017.
Matas, J. et al., Sim-To-Real Reinforcement Learning For Deformable Object Manipulation; In Conference on Robot earning; 10 pages; 2018.
Patel, V. et al., "Visual Domain Adaptation: A Survey Of Recent Advances;" IEEE Signal Processing Magazine; pp. 53-69, May 2015.
Pinto et al.; Supersizing Self-supervision_ Learning to Grasp from 50K Tries and 700 Robot Hours; 2016 IEEE International Comference on Robotics and Automation (ICRA); pp. 3406-3413.
Sadeghi, F. et al., "(Cad)2RL: Real Single-Image Flight Without A Single Real Image;" Cornell University, arXiv.org, arXiv:1611.04201v2; 11 pages; Dec. 7, 2016.
Sadeghi, F. et al., "Sim2real View Invariant Visual Servoing By Recurrent Control;" Cornell University, arXiv.org, arXiv:1712.07642v1; 11 pages; dated Dec. 20, 2017.
Shrivastava, A. et al., "Learning from Simulated and Unsupervised Images through Adversarial Training;" In Conference on Computer Vision and Pattern Recognition; 10 pages; 2017.
Tobin, J. et al., "Domain Randomization For Transferring Deep Neural Networks From Simulation To The Real World;" 2017 IEEE/RSJ International Conference on Intelligent Robots and Systems (IROS), 8 pages.
Yoo, D. et al., "Pixel-Level Domain Transfer;" Cornell University, arXiv.org, arXiv:1603.07442v3; 17 pages; Nov. 28, 2016.
Zhang, H. et al., "Self-Attention Generative Adversarial Networks;" Cornell University, arXiv.org, arXiv:1805.08318v2; 10 pages: Jun. 14, 2018.
Bohg, J. et al., "Data-Driven Grasp Synthesis—A Survey;" IEEE Transactions on Robotics, vol. 30, No. 2; pp. 289-309; dated Apr. 2014.
China National Intellectual Property Administration; Notification of First Office Action issued in Application No. 202080073683.7; 14 pages Jun. 4, 2024.
Sui, Hongjian et al.; "Robot control policy transfer based on progressive neural network"; 8 pages, dated Oct. 15, 2019.
China National Intellectual Property Administration; Notice of Grant issued in Application No. 202080073683.7; 6 pages Oct. 25, 2024.
European Patent Office; Communication pursuant to Article 94(3) EPC issued in Application No. 20731652.2; 8 pages; dated Dec. 23, 2024.

* cited by examiner

MITIGATING REALITY GAP THROUGH TRAINING A SIMULATION-TO-REAL MODEL USING A VISION-BASED ROBOT TASK MODEL

BACKGROUND

Various machine learning based approaches to robotic control have been proposed. Some of those approaches train a machine learning model (e.g., a deep neural network model) that can be utilized to generate one or more predictions that are utilized in control of a robot, and train the machine learning model using training data that is based only on data from real-world physical robots. However, these and/or other approaches can have one or more drawbacks. For example, generating training data based on data from real-world physical robots requires heavy usage of one or more physical robots in generating data for the training data. This can be time-consuming (e.g., actually operating the real-world physical robots requires a large quantity of time), can consume a large amount of resources (e.g., power required to operate the robots), can cause wear and tear to the robots being utilized, and/or can require a great deal of human intervention.

In view of these and/or other considerations, use of robotic simulators has been proposed to generate simulated data that can be utilized in generating simulated training data that can be utilized in training of the machine learning models. However, there is often a meaningful "reality gap" that exists between real robots and simulated robots (e.g., physical reality gap) and/or real environments and simulated environments simulated by a robotic simulator (e.g., visual reality gap). This can result in generation of simulated training data that does not accurately reflect what would occur in a real environment. This can affect performance of machine learning models trained on such simulated training data and/or can require a significant amount of real world training data to also be utilized in training to help mitigate the reality gap.

More particularly, various techniques have been proposed to address the visual reality gap. Some of those techniques randomize parameters of a simulated environment (e.g., textures, lighting, cropping, and camera position), and generate simulated images based on those randomized parameters. Such techniques theorize that a model trained based on training instances that include such simulated images will be better adapted to a real-world environment may (e.g., since the real-world environment may be within a range of these randomized parameters). However, this randomization of parameters requires a user to manually define which parameters of the simulated environment are to be randomized. Moreover, policies generated using machine learning models trained based on simulated training data from randomized simulated environments are task-agnostic (i.e., general policies, scripted policies, etc.) as opposed to task-aware (i.e., specific to a given robotic task), which can result in semantics (e.g., objects, robot pose(s), and/or other semantics) and styles (e.g., lighting, textures, and/or other styles) being removed during adaptation to real-world environments.

Some other techniques include training either a Generative Adversarial Network ("GAN") model or a Cycle Generative Adversarial Network ("CycleGAN") model to adapt image-to-image translations between simulated environments and real-world environments. Although both GAN models and CycleGAN models produce a more realistic adaptations for real-world environments, policies generated using GAN models and CycleGAN models are still task-agnostic as opposed to task-aware, which can result in semantics (e.g., objects, robot pose(s), and/or other semantics) and styles (e.g., lighting, textures, and/or other styles) to be removed during adaptation to real-world environments. Further, an outcome of a robotic task (e.g., grasping task, navigational task, path planning task, etc.) can be negatively impacted due to the task-agnostic nature of these various techniques.

SUMMARY

Implementations disclosed herein relate to mitigating the reality gap through training a simulation-to-real machine learning model ("Sim2Real" model) using a vision-based robot task machine learning model(s). The vision-based robot task machine learning model(s) can be, for example, a reinforcement learning ("RL") neural network model (RL-network), such as an RL-network that represents a Q-function or other value function. For example, the RL-network, that represents a value function can be used to process a given image and a given action and generate a predicted value (e.g., Q-value) that represents the value of implementing the given action, in view of the given image. As described herein, the vision-based robot task machine learning model(s) can be trained based on outputs generated based on processing predicted real images using the vision-based robot task machine learning model(s). The predicted real images are generated by processing the simulated images using the Sim2Real model. Moreover, the Sim2Real model can also be trained, along with the training of the vision-based robot tack machine learning model(s), based in part on outputs generated using the vision-based robot task machine learning model(s). For example, the Sim2Real model can be trained based on variances in outputs generated by processing, using the vision-based robot task machine learning model, a simulated image, a corresponding predicted real image (generated by processing the simulated image using the Sim2Real model), and a corresponding predicted simulated image (generated by processing the predicted real image using a real-to-simulation ("Real2Sim") machine learning model). In these and other manners, the Sim2Real model can be trained to generate predicted real images that are tailored to the robotic task for which the vision-based robot task machine learning model(s) is being trained. This can help mitigate the reality gap as the Sim2Real model is trained to generate predicted real images that include attributes that are relevant to the robotic task. Accordingly, performance of the vision-based robot task machine learning model(s) is improved when the vision-based robotic machine learning model(s) (trained based on predicted real images and/or predicted simulated images generated using the Sim2Real model) is subsequently utilized on a real robot and processes real images from vision component(s) of the real robot.

In various implementations, the Sim2Real model can be further trained based on additional and/or alternative losses. The additional and/or alternative losses can include, for example, one or more adversarial losses, one or more cycle consistency loss, one or more temporal difference losses, and/or other losses. For example, assume the Sim2Real model is a Sim2Real generator model of generative adversarial network model ("GAN" model) that includes a Sim2Real generator model and a Sim2Real discriminator model. The Sim2Real generator model of the Sim2Real GAN model can generate predicted real image(s) by processing the simulated image(s), and the discriminator component of the Sim2Real model can determine whether the predicted real image(s) is an actual real image or the predicted real image(s) by processing the predicted real image(s). Based on this determination, a Sim2Real adversarial loss for the Sim2Real GAN model can be generated and utilized to further train the generator Sim2Real model of the Sim2Real GAN model. An adversarial loss for a Real2Sim GAN model can also be generated in a similar manner, and can also be utilized to further train the Sim2Real model. As another example, assume the Sim2Real model is part of a cycle generative adversarial network model ("CycleGAN" model) that also includes the Real2Sim model ("Sim2Real2Sim CycleGAN" model). The Sim2Real GAN model of the Sim2Real2Sim CycleGAN can generate predicted real image(s) by processing the simulated image(s), and the Real2Sim GAN model of the Sim2Real2Sim CycleGAN model can generate predicted simulated image(s) by processing the predicted real image(s). The simulated image(s) and the predicted simulated image(s) can be compared, and a Sim2Real2Sim cycle consistency loss for the Sim2Real2Sim model can be determined based on the comparison. The cycle consistency loss can be utilized to further train the Sim2Real generator model of the Sim2Real GAN model of the Sim2Real2Sim CycleGAN model. A Real2Sim2Real cycle consistency loss for a Real2Sim2Real CycleGAN model can also be generated in a similar manner, and can also be utilized to further train the Sim2Real generator model of the Sim2Real GAN model of the Real2Sim2Real CycleGAN model. As yet another example, a standard temporal difference loss ("TD-loss") can be generated based on processing, using the vision-based robot task machine learning model, the images of a Sim2Real2Sim and Real2Sim2Real image triples along with a corresponding simulated or real robot action, and the TD-loss can also be utilized to further train the Sim2Real model.

In some implementations, a method implemented by one or more processors is provided that includes processing a simulated image, using a simulation-to-real generator model, to generate a simulated episode predicted real image. The simulated image is generated by a robotic simulator during a simulated episode of a simulated robot attempting performance of a robotic task. The method further includes processing the simulated episode predicted real image, using a real-to-simulation generator model, to generate a simulated episode predicted simulation image. The method further includes: processing the simulated image along with a simulated robot action, using a task machine learning model for use in the robotic task, to generate a first predicted value; processing the simulated episode predicted real image along with the simulated robot action, using the task machine learning model, to generate a second predicted value; and processing the simulated episode predicted simulated image along with the simulated robot action, using the task machine learning model, to generate a third predicted value. The method further includes generating a loss as a function of comparisons of the first predicted value, the second predicted value, and the third predicted value, and updating the simulation-to-real generator model based on the generated loss.

This method and other implementations of technology disclosed herein may each optionally include one or more of the following features.

In some implementations, the method may further include processing a real image, using the real-to-simulation generator model, to generate a real episode predicted simulation image. The real image is captured by a real camera, associated with a real robot, during a real episode of the real robot attempting performance of the robotic task. The method may further include processing the real episode predicted simulation image, using the simulation-to-real generator model, to generate a real episode predicted real image. The method may further include: processing the real image along with a real robot action, using the task machine learning model or an additional task machine learning model for use in the robotic task, to generate a fourth predicted value; processing the real episode predicted simulated image along with the real robot action, using the task machine learning model or the additional task machine learning model, to generate a fifth predicted value; and processing the real episode predicted real image along with the real robot action, using the task machine learning model or the additional task machine learning model, to generate a sixth predicted value. In some versions of those implementations, generating the loss may be further a function of additional comparisons of the fourth predicted value, the fifth predicted value, and the sixth predicted value.

In some implementations, the comparisons of the first predicted value, the second predicted value, and the third predicted value comprise three comparisons. Each of the three comparisons can be between a unique pair of the first predicted value, the second predicted value, and the third predicted value (i.e., the first predicted value compared to the second predicted value, the second predicted value compared to the third predicted value, and the first predicted value compared to the third predicted value). In some versions of those implementations, the additional comparisons of the fourth predicted value, the fifth predicted value, and the sixth predicted value comprise three additional comparisons. Each of the three additional comparisons can be between a unique pair of the fourth predicted value, the fifth predicted value, and the sixth predicted value.

In some implementations, generating the loss may be further a function of an adversarial loss and/or a cycle consistency loss, wherein the adversarial loss and the cycle consistency loss are both generated independent of any outputs generated using the task machine learning model or the additional task machine learning model. In some versions of those implementations, the adversarial loss may be generated based on whether a simulation-to-real discriminator model predicts the predicted real image is an actual real image or the predicted real image generated by the simulation-to-real generator. In some versions of those implementations, the cycle consistency loss may be generated based on comparison of the simulated image and the simulated episode predicted simulated image. In some further versions of those implementations, generating the loss may be further a function of both the adversarial loss and the cycle consistency loss.

In some implementations, the task machine learning model may represent a Q-function. The task machine learning model may be trained during reinforcement learning based on the simulated episode and additional simulated episodes, and the first predicted value may be a first Q-value, the second predicted value may be a second Q-value, and the third predicted value may be Q-value.

In some implementations, the method may further include generating a task machine learning model loss based on the second predicted value, and updating the task machine learning model based on the task machine learning model loss. In some versions of those implementations, generating the task machine learning model loss is independent of the first predicted value, the third predicted value, the fifth predicted value, and the sixth predicted value. In some further versions of those implementations, generating the task machine learning model loss may be further based on the fourth predicted value.

In some implementations, the simulated episode may be an offline episode. In some alternative implementations, the simulated episode may be an online episode.

In some implementations, the robotic task may be an object manipulation task or a navigation task. In some versions of those implementations, the robotic task may be the object manipulation task, and the object manipulation task may be a grasping task.

In some implementations, a method implemented by one or more processors is provided that includes training a simulation-to-real generator model, wherein training the simulation-to-real generator model. Training the simulation-to-real generator model includes iteratively updating the simulation-to-real generator model based on a reinforcement learning scene consistency loss that is generated based on a plurality of predicted values that are generated using a task machine learning model or an additional task machine learning model. The method further includes, subsequent to training the simulation-to-real generator model, generating a robotic control policy for a real robot based on simulated training data generated using the simulation-to-real generator model, and causing the real robot to be controlled based on the generated robotic control policy.

This method and other implementations of technology disclosed herein may each optionally include one or more of the following features.

In some implementations, the plurality of predicted values that are generated using the task machine learning model are generated based on processing, using the task machine learning or the additional task machine learning model, a simulation-to-real-to-simulation image triple. Further, the reinforcement learning scene consistency loss that is generated based on the plurality of predicted values is generated based on comparisons of the plurality of predicted values.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

The above description is provided as an overview of some implementations of the present disclosure. Further description of those implementations, and other implementations, are described in more detail below.

DETAILED DESCRIPTION

Figure 1:
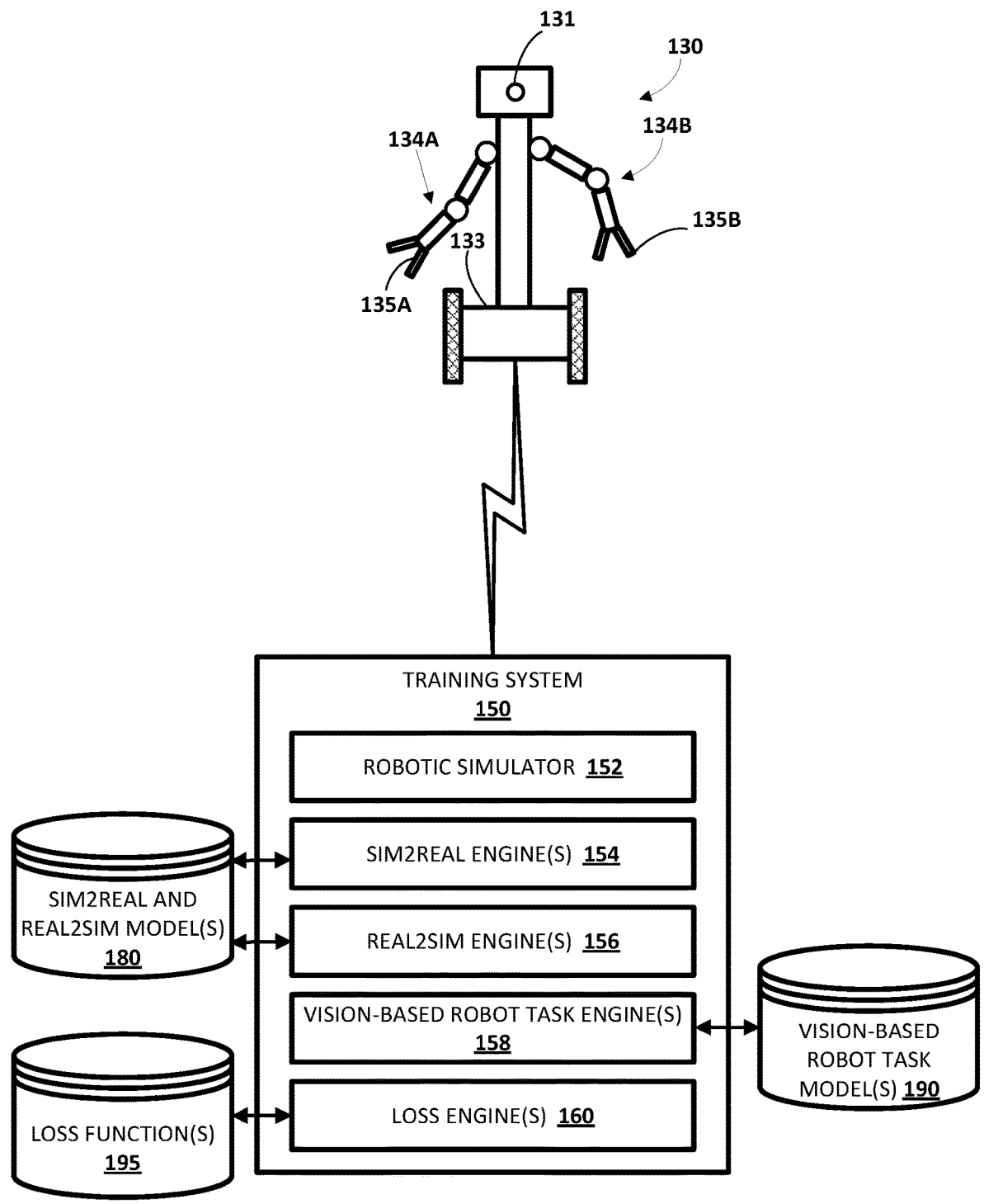
FIG. 1 illustrates an example robot, and an example training system, in accordance with various implementations disclosed herein.

Turning now to the drawings, FIG. 1 illustrates an example robot 130 and an example training system 150. Robot 130 includes a base 133 with wheels provided on opposed sides thereof for locomotion of the robot 130. The base 133 may include, for example, one or more motors for driving the wheels of the robot 130 to achieve a desired direction, velocity, and/or acceleration of movement for the robot 130. Although robot 130 is depicted as a mobile robot in FIG. 1 having the base 133 with wheels provided on opposed sides thereof for locomotion of the robot 130, it should be understood that is for the sake of example and is not meant to be limiting, and that additional and/or alternative robots, mobile or immobile, may be provided. For example, mobile telepresence robots, humanoid robots, robotic arms, and/or other robots may be provided as the only robots and/or with other robots in some implementations.

Robot 130 also includes vision component(s) 131. In some implementations, the vision component(s) 131 may include a monocular camera that includes a single sensor (e.g., a charge-coupled device (CCD)), and generates, based on physical properties sensed by the sensor, images that each includes a plurality of data points defining color values and/or grayscale values. For instance, the monocular camera may generate images that include red, blue, and/or green channels. Each channel may define a value for each of a plurality of pixels of the image such as a value from 0 to 255 for each of the pixels of the image. In some implementations, the vision component(s) 131 may include a stereographic camera that includes two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels. In some implementations, the vision component(s) 131 may include a stereographic camera, but only one of the sensors may be used to generate images that do not include a depth channel. Additional vision component(s) separate from robot 130 can also be included to capture real image(s).

Robot 130 also includes one or more processors that, for example, provide control commands to actuators and/or other operational components thereof, generate control commands for various tasks, etc. For example, one or more processors of robot 130 may provide control commands to servo motors that drive the wheels of the robot 130 to navigate the robot 130 to various locations in the environment autonomously and/or semi-autonomously. Also, for example, one or more processors of robot 130 may implement all or aspects of training system 150 and/or perform all or aspects of method 500 of FIG. 5. Additional description of some examples of the structure and functionality of various robots is provided herein (e.g., with respect to robot 620 of FIG. 6).

The robot 130 also includes robot arms 134A and 134B with corresponding end effectors 135A and 135B that each take the form of a gripper with two opposing "fingers" or "digits." The robot arms 134A, 134B and end effectors 135A, 135B may be controlled autonomously, semi-autonomously, and/or based on control commands provided by a user via a computing device of a user. For example, the robot arm 134B may be autonomously controlled to position the end effector 135B proximal to an object and the end effector 135B may be autonomously controlled to grasp the object. In some of those implementations, the processor(s) of the robot 130 may generate control commands to control robot arm 134B and/or end effector 135B and generating those control commands may be influenced at least in part by a current pose of the robot 130 determined according to techniques described herein. Moreover, robot 130 can perform various tasks, such as object manipulation tasks, navigational tasks, path planning tasks, and/or other robotic tasks, using robot arms 134A, 134B and end effectors 135A, 135B.

All or aspects of training system 150 may be implemented by the robot 130 in some implementations. In some implementations, all or aspects of training system 150 may be implemented by one or more remote computing systems and/or devices that are in communication with the robot 130 (e.g., computing device 910 of FIG. 9) over network(s) (e.g., local area network (LAN), wide area network (WAN), Bluetooth, and/or other networks). Various modules or engines may be implemented as part of training system 150 as software, hardware, or any combination of the two. For example, as shown in FIG. 1, training system 150 can include a robotic simulator 152, simulation-to-real ("Sim2Real") engine(s) 154, real-to-simulation ("Real2Sim") engine(s) 156, vision-based robot task engine(s) 158, and loss engine(s) 160.

In some implementations, vision-based robot task engine(s) 158 can apply a simulation-to-real-to-simulation ("Sim2Real2Sim") image triple of [simulated image, predicted real image, cycled simulated image] as input across vision-based robot task model(s) 190 (e.g., an RL-network) to generate a predicted value for each of the images in the Sim2Real2Sim image triple. The simulated image of the image triple can be generated by a robotic simulator 152 during performance of a simulated episode of a robotic task for which the vision-based robot task model(s) 190 is being trained. The predicted real image of the Sim2Real2Sim image triple is generated by Sim2Real engine(s) 154 processing the simulated image, using a Sim2Real model stored in the Sim2Real and Real2Sim model(s) database 180, and the predicted simulated image of the image triple is generated by Real2Sim engine(s) 156 processing the predicted real image, using a Real2Sim model stored in the Sim2Real and Real2Sim model(s) database 180.

Since each of the images in the Sim2Real2Sim image triple represent the same scene, there should be little to no variance in the predicted values for the Sim2Real image triple. Loss engine(s) 160 can generate, using loss function(s) 195, a Sim2Real2Sim RL-scene consistency loss based on the variance in the three predicted values, each generated based on processing a corresponding image, of the Sim2Real2Sim image triple, using the vision-based robot task model(s) 190. The loss engine(s) 160 can backpropagate the Sim2Real2Sim RL-scene consistency loss across the Sim2Real model to update one or more weights of the Sim2Real model, thereby training the Sim2Real model in view of the particular robotic task for which the vision-based robot task model(s) 190 is being trained. This training of the Sim2Real model using the vision-based robot task model(s) enables a trained RL policy (e.g., reflected by the vision-based robot task model(s) stored in the vision-based robot task model(s) database 190) to be generated based on simulated episodes from simulated environments, and that more accurately reflect real-world environments. Further, by training a Sim2Real model along with the vision-based robot task model(s) 190, the Sim2Real model stored in the Sim2Real and Real2Sim model(s) database 180 is task-aware (i.e., specific to a given robotic task) as opposed to task-agnostic (i.e., general policies, scripted policies, etc.). In other words, this training technique can be performed to train various Sim2Real models that are specific for a given robotic task (e.g., a Sim2Real model for grasping tasks, a Sim2Real model for navigational tasks, a Sim2Real model for path planning tasks, and/or other Sim2Real models for other robotic tasks). Moreover, in various implementations, this training of the Sim2Real model can be performed jointly with training of the vision-based robot task model(s)). Thus, when a policy that is generated in a simulated environment based on simulated training data is transferred to a real robot (e.g., robot 130) for use in a real-world environment, robotic performance for a given robotic task can be improved as compared to policies trained using various other techniques.

In some implementations, the Sim2Real model that is trained according to the techniques described herein is a Sim2Real generator model of a generative adversarial network ("GAN") model. The GAN model includes at least a Sim2Real generator model and a Sim2Real discriminator model stored in the Sim2Real and Real2Sim model(s) database 180. In some versions of those implementations, the Sim2Real generator model is used to processes the simulated image to generate a predicted real image that corresponds to the simulated image. Further, the Sim2Real discriminator model can be used to evaluate the predicted real image to predict whether the predicted real image is truly a real image or a predicted real image generated using the Sim2Real generator model. In some versions of those implementations, a Real2Sim generator model can be used to process a real image to generate a predicted simulated image that corresponds to the real image. Further, a Real2Sim discriminator model can evaluate the predicted simulated image to predict whether the predicted simulated image is truly a simulated image or a predicted simulated image generated by the Real2Sim generator model. The loss engine(s) 160 can generate an adversarial loss based on these predictions generated using the discriminator model(s), and the adversarial loss can be used as part of a loss that is backpropagated across the GAN model. Thus, the goal of the generator model is to "fool" the discriminator model to maximize the adversarial loss, and the goal of the discriminator model is to minimize the adversarial loss thereby improving the GAN model.

In additional and/or alternative implementations, the Sim2Real model that is trained according to the techniques described herein is a Sim2Real generator model of cycle generative adversarial network model ("CycleGAN" model). The CycleGAN model includes at least a Sim2Real GAN model and a Real2Sim GAN model stored in the Sim2Real and Real2Sim model(s) database 180, where both of the Sim2Real GAN model and the Real2Sim GAN model each include a corresponding generator model and a corresponding discriminator model. In some versions of those implementations, the Sim2Real generator model is a Sim2Real generator model of a Sim2Real2Sim CycleGAN model that can generate a simulated image based on a distribution of real images, and can process the simulated image to generate a predicted real image that corresponds to the simulated image (or process simulated images generated by the robotic simulator 152). Further, a Sim2Real discriminator model, of the Sim2Real2Sim CycleGAN model, can evaluate the predicted real image to predict whether the predicted real image is truly a real image or a predicted real image generated by the Sim2Real generator model. Moreover, a Real2Sim generator model, of the Sim2Real2Sim CycleGAN model, can process the predicted real image to generate a predicted simulated image that corresponds to the predicted real image. Accordingly, the predicted simulated image should also correspond to the original simulated image, and the loss engine(s) 160 can generate a Sim2Real2Sim cycle consistency loss for the Sim2Real2Sim CycleGAN model based on comparing the simulated image to the predicted simulated image. Further, a Real2Sim discriminator model, of the Sim2Real2Sim CycleGAN model, can evaluate the predicted simulated image to predict whether the predicted simulated image is truly a real image or a predicted simulated image generated by the Real2Sim generator model. Utilization of this Sim2Real2Sim CycleGAN technique results in a Sim2Real2Sim image triple of [simulated image, predicted real image, predicted simulated image]. Further, the loss engine(s) 160 can generate an adversarial loss based on the above determinations using the Sim2Real and/or Real2Sim discriminator models, and the adversarial loss can be used as part of a loss that is backpropagated across the Sim2Real2Sim CycleGAN model to update the Sim2Real generator model.

In some other versions of those implementations, the Real2Sim generator model, of a Real2Sim2Real CycleGAN model stored in the Sim2Real and Real2Sim model(s) database 180, can process a real image to generate a predicted simulated image that corresponds to the real image. Further, the Real2Sim discriminator model, of the Real2Sim2Real CycleGAN model, can evaluate the predicted simulated image to determine whether the predicted simulated image is truly a simulated image or a predicted simulated image generated by the Real2Sim generator model. Moreover, a Sim2Real generator model, of the Real2Sim2Real CycleGAN model, can process the simulated image to generate a predicted real image that corresponds to the predicted simulated image. Accordingly, the predicted real image should also correspond to the original real image, and the loss engine(s) 160 can generate a Real2Sim2Real cycle consistency loss for the Real2Sim2Real CycleGAN model based on comparing the real image to the predicted real image. Further, the Sim2Real discriminator model, of the Real2Sim2Real CycleGAN model, can evaluate the predicted real image to predict whether the predicted real image is truly a real image or a predicted real image generated by the Sim2Real generator model. Utilization of this Sim2Real2Sim CycleGAN technique results in a Real2Sim2Real image triple of [real image, simulated image, predicted real image]. The loss engine(s) 160 can generate adversarial losses based on the above determinations the Real2Sim and/or Sim2Real discriminator models, and the adversarial losses can be used as part of a loss that is backpropagated across the Real2Sim2Real CycleGAN model. The Real2Sim2Real adaptation can be performed off-policy, and can be utilized to quickly improve performance in these models in generating a policy, using the vision-based robot task model(s) stored in the vision-based robot task model(s) database 190, to perform a robotic task.

In some implementations, the vision-based robot task model(s) database 190 include an RL-trained Q-function that can be used for vision-based RL, and can be based on a continuous-action generalization of Q-learning, which is sometimes reference herein as "QT-Opt". Unlike other continuous action Q-learning methods, which are often unstable, QT-Opt dispenses with the need to train an explicit actor, and instead uses stochastic optimization to select actions (during inference) and target Q-values (during training). Further, a Q-function can be trained using QT-Opt to select actions to evaluate in view of a current state and, using a policy to generate Q-values, to select a given action (from the evaluated actions) to implement in view of the current state. The policy used to generate these Q-values can be generated using a Sim2Real model trained using simulated data, and can be transferred to a real robot (e.g., robot 130). In some implementations, the Sim2Real model used to generate a policy for generating the Q-values is a Sim2Real generator model of GAN model stored in the Sim2Real and Real2Sim model(s) database 180. In some other implementations, the Sim2Real model used to generate a policy for generating the Q-values is a Sim2Real generator model of CycleGAN model stored in the Sim2Real and Real2Sim model(s) database 180. Notably, the Sim2Real generator model of the GAN model and CycleGAN model can be the same Sim2Real generator model.

In some implementations, a Sim2Real2Sim image triple of [simulated image, predicted real image, predicted simulated image] can be applied as input across a Q-network to generate a Q-value for each of the images. The simulated image of the Sim2Real2Sim image triple can be generated by the robotic simulator 152 during performance of a simulated episode of a robotic task for which the Q-network is being trained. As noted above, the predicted real image of the Sim2Real2Sim image triple can be generated by processing the simulated image using a Sim2Real generator model of a GAN model and/or CycleGAN model, and the predicted simulated image of the Sim2Real2Sim image triple is generated by processing the predicted real image using a Real2Sim generator model of a GAN model and/or CycleGAN model.

Since each of the images in the Sim2Real2Sim image triple represent the same scene, there should be little to no variance in the Q-values for the Sim2Real2Sim image triple. A Sim2Real2Sim RL-scene consistency loss can be determined based on the variance in Q-values in the Sim2Real2Sim image triple. In some versions of those implementations, a Real2Sim2Real image triple of [real image, simulated image, predicted real image] can be applied as input across the Q-network or an additional Q-network to generate a Q-value for each of the images. Since each of the images in the Real2Sim2Real image triple also represent the same scene, there should be little to no variance in the Q-values for the Real2Sim2Real image triple. A Real2Sim2Real RL-scene consistency loss can be determined based on the variance in Q-values in the Real2Sim2Real image triple. Moreover, when an RL-trained Q-function is utilized, a standard temporal difference loss ("TD-loss") can also be generated.

This RL-scene consistency loss, Sim2Real2Sim RL-scene consistency loss and/or Real2Sim2Real RL-scene consistency loss, can be backpropagated across the Sim2Real model by the loss engine(s) 160, thus resulting in training of the Sim2Real model, and optionally joint training of the vision-based robot task model(s) stored in the vision-based robot task model(s) database 190. In some implementations, one or more additional or alternative losses can be backpropagated across the GAN mode and/or CycleGAN model to train the Sim2Real model. The one or more losses can include: a first adversarial loss of a first GAN model of the CycleGAN model, a second adversarial loss of a second GAN model of the CycleGAN model, a cycle consistency loss of the CycleGAN, and/or a TD-loss of the RL network, for each of Sim2Real2Sim and Real2Sim2Real. Notably, by backpropagating the RL-scene consistency loss across the CycleGAN model, the vision-based robot task model(s) ensures that semantics (e.g., objects, robot pose(s), and/or other semantics) and/or styles (e.g., lighting, textures, and/or other styles) for a given robotic task of the vision-based robot task model(s) are preserved across a scene. As a result, a policy generated in a simulated environment, using the vision-based robot task model(s) trained in accordance with the techniques described herein, is better suited for use in a real-world environment. Accordingly, this training of the Sim2Real model (and optionally joint training along with the vision-based robot task model(s)) results in policies that are generated in simulated environments, that more accurately reflect real-world environments, and that are tailored to a particular task. Moreover, the Sim2Real model(s) can be trained to preserve different semantics (e.g., objects, robot pose(s), and/or other semantics) and/or styles (e.g., lighting, textures, and/or other styles) based on the actions evaluated in training the vision-based robot task model(s) stored in the vision-based robot task model(s) database 190.

For example, based on a distribution of real images, assume a robotic simulator 152 generates a simulated environment for a simulated episode of a robotic task, where the distribution of real images can be based on real episodes of the robotic task and data logs associated with the real episodes of the robotic task. Further, the Sim2Real engine(s) 154 can generate, using a Sim2Real generator model stored in the Sim2Real and Real2Sim model(s) database 180, a predicted real image based on the simulated image, and the Real2Sim engine(s) 156 can generate, using a Real2Sim generator model stored in the Sim2Real and Real2Sim model(s) database 180, a predicted simulated image based on the predicted real image. This results in a Sim2Real2Sim image triple of [simulated image, predicted real image, predicted simulated image] that each correspond to the same scene.

Moreover, the vision-based robot task engine(s) 158 can utilize the Sim2Real2Sim image triple of [simulated image, predicted real image, predicted simulated image] for training of a vision-based robot task model stored in the vision-based robot task model(s) 190. In some implementations, the vision-based robot task model is a value-network that applies, as input across the network, each image of the Sim2Real2Sim image triple and a candidate action to be performed for the robotic task. The value-network can be used to determine a predicted value for each of the images. Each of the predicted values can be determined based on evaluating the candidate action to be performed for the robotic task in view of a corresponding one of the images of the Sim2Real2Sim image triple (e.g., probability indicative of successful performance of the robotic task if the one or more candidate actions are applied). In some other implementations, the vision-based robot task model is a Q-function that applies, as input across the Q-function, each image of the Sim2Real2Sim image triple and one or more candidate actions to be performed for the robotic task. The Q-function can determine a Q-value for each of the images based on evaluating one or more of the candidate actions to be performed for the robotic task in view of a given image in the Sim2Real2Sim image triple to gauge success in performance of the robotic task. In these implementations, there should be little to no variance amongst the predicted values and/or the Q-values because each image in the Sim2Real2Sim image triple corresponds to the same scene. Based on these variances, the loss engine(s) 160 can generate a RL-scene consistency loss for the vision-based robot task model, and can backpropagate the RL-scene consistency loss across the Sim2Real model.

For example, if a given robotic task is an object manipulation task, such as a grasping task, but the predicted simulated image of the Sim2Real2Sim image triple has removed an object that is a focus of the grasping task, then there will be a large variance of the predicted values and/or Q-values across the Sim2Real2Sim image triple. Accordingly, by backpropagating the RL-scene consistency loss for the vision-based robot task model across the Sim2Real model, the Sim2Real model can learn to preserve this object. In this manner, the Sim2Real model can learn to preserve not only objects, but also other semantics and/or styles that are important for a given task.

In some additional and/or alternative implementation, techniques disclosed herein can be utilized in combination with other non-reinforcement learning training. For example, rather than using an RL technique, such as Q-learning, a Sim2Real model can be-trained using a value-network that predicts whether or not a given action will result in successful performance of a task (e.g., one or more motor commands result in a successful grasp) without considering a reward function during the training. In some versions of those implementations, the value-network can be jointly trained along with the Sim2Real model. For instance, the value-network can be trained using supervised or semi-supervised training instances that each include an image and candidate action as training instance input, and a labeled probability that indicates the likelihood that the candidate action will lead to success of the robotic task, in view of the image.

Accordingly, techniques described herein implement a Sim2Real2Sim CycleGAN model and/or Real2Sim2Real CycleGAN model to mitigate the visual reality gap that is trained based on at least a loss from vision-based robot task model(s) stored in the vision-based robot task model(s) database 190, to thereby improve real-world vision-based control policies. In some implementations, by incorporating RL-scene consistency losses of a current Q-function along with losses of a Sim2Real2Sim CycleGAN model and/or Real2Sim2Real CycleGAN model, style and/or semantics of Sim2Real images can be improved for a given robotic task. For example, these losses can adapt a simulated image to look realistic, while the RL-scene consistency losses ensure relevant semantics of the Sim2Real images are preserved. Moreover, by training the Sim2Real model using the vision-based robot task model(s) (and optionally jointly training the Sim2Real model along with the vision-based robot task model(s)) stored in the vision-based robot task model(s) database 190 for a given task, there is no need for generating scene segmentations masks for grasping tasks or defining a canonical scene and simulation randomization of simulated images.

As used herein, the "reality gap" that exists between real robots and simulated robots (e.g., physical reality gap) and/or real environments and simulated environments simulated by a robotic simulator (e.g., visual reality gap). The techniques disclosed herein are directed to mitigating the visual reality gap real environments and simulated environments simulated by a robotic simulator.

Training of machine learning models that are robust and accurate, and that can be utilized for control of real-world physical robots (e.g., robot 130), is often limited by the scalability of using real-world physical robots to generate a sufficient quantity of training data and/or to generate training data that is sufficiently diverse. For example, for many challenging robotic tasks (e.g., object manipulation tasks, navigational task, path planning tasks, and/or other robotic tasks), repeatedly running real robot experiments to collect real training data is infeasible in the real world. Accordingly, training of machine learning models using simulated training data from the robotic simulator 152 is a faster and cheaper alternative compared to collecting and using real training data. However, simulated training data is not perfect, and machine learning models trained using simulated training data do not always transfer to the real-world due to the reality gap.

Implementations described herein present techniques for mitigating the reality gap between a robotic simulator 152, and real-world physical robot(s) (e.g., robot 130) and/or a real-world environment through training the Sim2Real model using vision-based robot task model(s) (e.g., RL) for a robot (e.g., robot 130). The reality gap in image-to-image translation for Sim2Real in generating policies can be mitigated by training the Sim2Real model& in this manner, and optionally jointly training the Sim2Real model along with the vision-based robot task model(s) (e.g., RL) for a robot (e.g., robot 130). The Sim2Real model can be a Sim2Real generator model of a GAN model, a CycleGAN model, and/or any other suitable Sim2Real model stored in the Sim2Real and Real2Sim model(s) database 180. For example, a GAN model can be used to adapt the pixels of a simulated image to be more realistic before use by a deep RL model stored in vision-based robot task model(s) database 190. As another example, a CycleGAN model can be used to adapt the pixels of a simulated image to be more realistic before use by a deep RL model stored in vision-based robot task model(s) database 190, and can also be used to enforce a cycle consistency between Sim2Real2Sim and Real2Sim2Real adaptations to produce better images for a deep RL model than a GAN or CycleGAN model alone. In this manner, a Sim2Real model of a CycleGAN model can be trained using a deep RL model (referred to herein as "RL-CycleGAN" training) to ensure the vision-based robot task model (e.g., RL model) is consistent across all adaptations. Further, by training the Sim2Real model of the CycleGAN model using a deep RL model (and optionally joint training of the RL model along with the Sim2Real model), real-world performance of various robotic tasks (e.g., grasping, path planning, navigation, etc.) can be greatly improved and require only a fraction of real training data as compared to known techniques. This RL-CycleGAN training technique can be used to train various CycleGAN models to generate policies that are task-aware (i.e., specific to a given robotic task) as opposed to task-agnostic (i.e., general policies, scripted policies, etc.) like a general GAN model or CycleGAN model.

RL provides a powerful tool to automate acquisition of visual representations for end-to-end training directly on a task-specific objective (e.g., grasping, path planning, navigation, etc.). For example, RL can be used to train deep neural network models (e.g., stored in vision based task model(s) database 190) for robots (e.g., robot 130) to grasp objects directly with image observations, or perform navigation with a mobile robot (e.g., robot 130) directly from on-board sensor readings of the mobile robot. However, the ability to learn visual representations end-to-end together with a task controller is costly in terms of collecting training data, and since the data needed for RL is typically task and policy specific, collecting this training data can be onerous. Accordingly, an appealing alternative is to generate simulated training data in simulated environments using simulated visual representations, and then use policies generated based on this simulated training data in real-world systems. However, by using this simulated training data, the policies result in improved representations of simulated environments, which may not accurately reflect real-world environments visually or physically (e.g., reality gap).

To mitigate this reality gap, the implementations described herein enable vision-based policies that are task-aware to be transferred from a simulated environment to real-world environments. In some implementations, simulated images can be automatically translated to realistic images via a CycleGAN model (e.g., using the Sim2Real engine(s) 154 and the Real2Sim engine(s) 156 as described above) that has access to an "off-policy" dataset of real observations, but no pairs of simulated-realistic images. For example, assume robotic task that is a closed-loop vision-based grasping task, and further assume a policy for the vision-based grasping task is learned via a deep Q-learning technique, such as QT-Opt, based on either simulated grasping episodes in simulated environment or real grasping episodes in a real environment. These real episodes are considered "off-policy" if they are collected with a scripted policy or a previously trained machine learning model, and are considered "on-policy" if they are collected using a Q-learning technique on real robots. Training machine learning models based on off policy data is more cost effective since the same off policy data can be reused as training data and does not require any new real episodes.

In some versions of these implementations, the Cycle-GAN model can employ a cycle consistency approach in training a Sim2Real model of the CycleGAN model since there are no pairs of simulated-realistic images. This approach provides pixel-level domain adaptation for the simulated images, and allows the CycleGAN model to be trained in simulation on images that reflect those the policy would encounter in the real-world. Further, by enforcing cycle consistency during training of the Sim2Real model of the CycleGAN model, geometric information is preserved in the simulated image that can be critical for a given task (e.g.

grasping task of a particular object) when encountered in a real image. However, and as noted above, the Real2Sim model of the CycleGAN model is a task-agnostic model, and task-relevant details may be altered between simulated images to real images encountered in the real-world. These alterations can negatively impact the performance of the RL policy generated using vision-based robot task model(s) that is trained using these simulated images. To reduce the impact caused by task-agnostic models, an RL-scene consistency loss can be used in training the Sim2Real model of the CycleGAN model (hence the term "RL-CycleGAN training"). In some implementations, an RL-trained Q-function can be used by the vision-based robot task engine(s) 158, and Q-values predicted by the RL-trained Q-function are invariant under the CycleGAN transformation due to the RL-scene consistency loss. The RL-scene consistency loss is general in that it can be used utilized for any RL problem.

Accordingly, the implementations described herein provide an RL-scene consistency loss for Sim2Real transfer of vision-based reinforcement learning policies, Sim2Real transfer based on this RL-scene consistency loss, and the Sim2Real model of the CycleGAN model, thereby resulting in an RL-CycleGAN model. The CycleGAN cycle consistency loss ensures preservation of high-level scene geometry and content, whereas the CycleGAN RL-scene consistency loss focuses on features that are critical for a current RL Q-function for which the vision-based robot task model is being trained. The combined CycleGAN cycle consistency loss and the CycleGAN RL-scene consistency loss for the current Q-function can be used to produce a Sim2Real image translation model that can be used to generate policies that effectively generalize the real-world.

As noted above, vision-based policies that are task-aware can be generated using a RL-CycleGAN model, and can be transferred from a simulated environment to real-world environments. For instance, given a current RL Q-function directed to a grasping task as the vision-based robot task model, a real RGB image captured by a vision sensor of a robot and candidate movement parameters of the robot can be used to continuously make grasp predictions as the robot attempts to grasp an object based on a vision-based robot control policy generated using the RL-CycleGAN model. These techniques can be in addition to or in lieu of hand-labeled grasp positions for an object and/or predicting an overall grasp outcome based on a given set of candidate movement parameters of a robot.

Also noted above, using simulated training data in simulated environments to train machine learning models (e.g., stored in the vision-based robot task model(s) database 190), and then using policies generated based on this simulated training data in real-world systems is an appealing approach. However, by using this simulated training data, the policies not accurately reflect real-world environments visually or physically (e.g., reality gap). More particularly, the simulated images may have unrealistic parameters, such as textures, lighting, colors, and/or objects, and policies generated based on the simulated images do not accurately reflect real-world environments visually.

Moreover, the techniques described herein can be considered a visual domain-level adaptation technique. Domain-level adaptation techniques aim to train machine learning models using training data from a source domain (e.g., simulated environment) in conjunction with training data from a target domain (e.g., real-world environment). In some implementations, the domain-level adaption technique includes feature-level adaptation techniques. Feature-level adaptation techniques can be used to learn invariant features of an environment that are well-defined in both simulated and real-world environments. In some other implementations, the domain-level adaption technique includes pixel-level adaptation techniques. Pixel-level adaptation techniques can be used to re-style pixels from a source image (e.g., simulated image) look like an image from the target domain (e.g., real-world environment) without any pairs of simulated-realistic images.

Moreover, pixel-level adaptation techniques use the Sim2Real generator model of the GAN model to re-style pixels from a source image (e.g., simulated image) look like an image from the target domain (e.g., real-world environment). However, the challenge in using a GAN model for Sim2Real transfer is that GAN models generate images based on a distribution of real-world images and not simulated images. To generate a robust GAN model for Sim2Real transfer, it is desirable to have a realistic version of the simulated image, and not just any realistic image. For example, for a robotic grasping task, additional loss terms can be imposed on a GAN model to ensure the semantics of a grasping image are retained in the Sim2Real adaptation. Further, a content based loss can also be imposed on the GAN model to ensure a generated adapted image does not deviate much from an input image. Even further, a special mask can also be created for the simulated image for the objects, and the GAN model can reproduce the special mask in addition to the generated adapted image. Accordingly, when training a RL task-based model (e.g., stored in the vision-based robot task model(s) database 190) for the robotic grasping task, real images can be mixed with adapted images, and a domain-adversarial loss can be applied across intermediate layers of the RL task-based model to learn domain invariant features.

Moreover, and as noted above, a CycleGAN model employ two GAN models that each include a simulator model and a discriminator model for both Sim2Real and Real2Sim (e.g., stored in the Sim2Real and Real2Sim model(s) database 180). In some implementations, a first GAN generator model of a given CycleGAN model can be a Sim2Real generator model that the Sim2Real engine(s) 154 can utilize to adapt an image from a source domain (e.g., simulated environment) to a target domain (e.g., real-world environment). In some further versions of those implementations, a second GAN generator model of the given CycleGAN model can be a Real2Sim generator model that the Real2Sim engine(s) 156 can utilize to adapt an image from a target domain (e.g., real-world environment) to a source domain (e.g., simulated environment). Further, the loss engine(s) 160 can generate a cycle consistency loss that ensures that when a given image is applied the first GAN model and the second GAN model in succession, that the adapted image is the given image. This enable the given CycleGAN model to preserve as much of a scene during adaptation since the image is reproduced from the adapted image by the second GAN model. Accordingly, visual differences caused by the reality gap can be mitigated because semantics of the scene (e.g., objects, robot pose(s), and/or other semantics) are preserved.

In some implementations, for Sim2Real image-to-image translation, a CycleGAN model can be trained to learn a mapping between two image domains X and Y, where X can represent a source domain of images (e.g., simulated images), and where Y can represent a target domain of images (e.g., real-world images). Further, in some versions of these implementations, this mapping can be based on unpaired images from each domain, such as $\{x_i\}_{i=1}^{N} \in X$ and $\{y_j\}_{j=1}^{M} \in Y$. Further, and as noted above, a CycleGAN model employ two GAN models (e.g., stored in the Sim2Real and Real2Sim model(s) database 180), and training a CycleGAN model includes learning mappings for two generators: a Sim2Real generator, G: X→Y, and a Real2Sim generator, F: Y→X. Moreover, each of the generators include a respective adversarial discriminator, $D_X$ and $D_Y$, and training the CycleGAN model enables each of the respective adversarial discriminators, $D_X$ and $D_Y$, to distinguish simulated images {x} from adapted simulation {F($\mathcal{Y}$)} and real images {$\mathcal{Y}$} from adapted real {G(x)}. Accordingly, in some versions of these implementations, when training the CycleGAN model to learn these mappings for two generators, an adversarial loss can be applied to both mappings. For example, for a Sim2Real2Sim CycleGAN model, the loss engine(s) 160 can generate, using loss function(s) stored in the loss function(s) database 195, an adversarial loss as represented by Equation 1:

$$\mathcal{L}_{GAN}(G,D_Y,X,Y) = \mathbb{E}_{\mathcal{Y} \sim Y}[\log D_Y(\mathcal{Y})] + \mathbb{E}_{x \sim X}[\log(1 - D_Y(G(x)))]$$ (Equation 1)

The Sim2Real generator G can produce realistic images by minimizing this adversarial loss against the loss against adversarial generator $D_Y$, whereas the adversarial generator $D_Y$ attempts to maximize this adversarial loss of the Sim2Real generator G, thereby resulting in an updated adversarial loss of $\min_G \max_{D_Y} \mathcal{L}_{GAN}(G,D_Y,X,Y)$ for the Sim2Real generator G. In comparison, the Real2Sim generator F can produce simulated images by minimizing the loss against adversarial generator $D_X$, whereas the adversarial generator $D_X$ attempts to maximize this adversarial loss of the Real2Sim generator F, thereby resulting in an updated adversarial loss of $\min_F \max_{D_X} \mathcal{L}_{GAN}(F,D_X,Y,X)$ for the Real2Sim generator F.

In some implementations, the loss engine(s) 160 can generate, using loss function(s) stored in the loss function(s) database 195, a cycle consistency loss for the CycleGAN model as represented by Equation 2:

$$\mathcal{L}_{cyc}(G,F) = \mathbb{E}_{x \sim D_{sim}} d(F(G(x)),x) + \mathbb{E}_{y \sim D_{real}} d(G(F(\mathcal{Y})),\mathcal{Y})$$ (Equation 2)

This cycle consistency loss ensures x→G(x)→F(G(x))≈x and $\mathcal{Y}$→F($\mathcal{Y}$)→G(F($\mathcal{Y}$))≈$\mathcal{Y}$, where d is some distance metric. In other words, the cycle consistency loss uses a mean-squared error to prevent drastic departures in generating Sim2Real and Real2Sim images across the CycleGAN model because the original image, whether a simulated image or a real image, is recoverable. However, a CycleGAN model trained in this manner is still task-agnostic (i.e., general policies, scripted policies, etc.) as opposed to task-aware (i.e., specific to a given robotic task), which can present issues when simulated policies generated using the CycleGAN model are transferred to real-world robots for performing challenging robotic tasks (e.g., grasping tasks, navigational task, path planning tasks, etc.)

Thus, training of a CycleGAN model can be combined with RL techniques to generate a CycleGAN model that is task-aware as opposed to task-agnostic. In some implementations, Q-learning can be used to learn a Q-function, Q(s, a) (e.g., stored in vision-based robot task model(s) database 190), for a vision-based task that represents a total expected future reward, where s is an input image, and where a is a candidate action performable based on the input image. Further, the loss engine(s) 160 can utilize given state transitions, (s, a, r, s'), and the Q-function, Q(s, a) can be updated, using loss function(s) stored in the loss function(s) database 195, to minimize a temporal difference loss ("TD-loss") as represented by Equation 3:

$$\ell_{(Q(s,a),r+\gamma V(s'))}$$ (Equation 3)

where V(s') is a target value, and where $\ell$ is a loss function. The target value, V(s'), can be estimated using Clipped Double Q-learning. Further, the Q-function can be jointly trained with a CycleGAN model (e.g., RL-CycleGAN training), and the Q-values can be used to add additional consistency loss to the CycleGAN training.

One advantage of using a task-aware CycleGAN model is that simulated images can be adapted to realistic images using a Sim2Real generator model while preserving semantics for purposes of performing the task. For example, with respect to a robotic grasping task, a typical GAN model and/or CycleGAN model can produce realistic images based on simulated images, but some semantics (e.g., objects, robot pose, etc.) and style (e.g., lighting, textures, etc.) that are present in the simulated images are removed when producing the realistic images by the Sim2Real engine(s) 154. These removed objects can alter an outcome of the robotic grasping task. Moreover, the distinction between semantics and style is not always clear, and can depend on particular robotic task to be performed. However, by using a task-aware Sim2Real generator model (e.g., stored in the Sim2Real and Real2Sim model(s) database 180) that is trained using a vision-based robot task model (e.g., stored in vision-based robot task model(s) database 190), the vision-based robot task model can constrain the Sim2Real generator model to indirectly preserve semantics and/or styles of the scene.

As noted above, in some implementations, a vision-based robot task model utilized by the vision-based robot task engine(s) 158 can be a deep Q-learning network (e.g., stored in the vision-based robot task model(s) database 190) that learns a Q-function, Q(s, a), for a vision-based task, where s is an input image, and where a is a candidate action performable based on the input image. In some implementations, a single Q-network, Q(s, a), can be used to represent Q-functions trained on simulated and real input images and candidate actions, (s, a). In some other versions of these implementations, multiple Q-networks, $Q_{sim}$(s, a) and $Q_{real}$(s, a), can be used to represent Q-functions trained on simulated and real input images and candidate actions, (s, a), respectively. The RL-CycleGAN model can jointly train the RL model with the Sim2Real generator model of the CycleGAN model, and each of six images, Sim2Real2Sim image triple {x, G(x), F(G(x))} and Real2Sim2Real image triple {$\mathcal{Y}$, F($\mathcal{Y}$), G(F($\mathcal{Y}$))} as described above, are passed to $Q_{sim}$(s, a) and $Q_{real}$(s, a), respectively, to generate a Q-value for each of the six images. The Q-value for each of the six images can be represented as:

$q_x = \mathbb{E}_{(x,a) \sim D_{sim}} Q_{sim}(x,a)$ $q_x' = \mathbb{E}_{(x,a) \sim D_{sim}} Q_{real}(G(x),a)$ $q_x'' = \mathbb{E}_{(x,a) \sim D_{sim}} Q_{sim}(F(G(x)),a)$ $q_y = \mathbb{E}_{(y,a) \sim D_{real}} Q_{real}(y,a)$ $q_y' = \mathbb{E}_{(y,a) \sim D_{real}} Q_{sim}(F(y),a)$ $q_y'' = \mathbb{E}_{(y,a) \sim D_{real}} Q_{real}(G(F(y)),a)$ Each of these Q-values correspond to a Q-value for a given image of the six images included in the Sim2Real2Sim image triple {x, G(x), F(G(x))} and the Real2Sim2Real image triple {$\mathcal{Y}$, F($\mathcal{Y}$), G(F($\mathcal{Y}$))}. Further, each of these six images should represent the same scene. Accordingly, the Q-values for each respective image triple should be similar, and to minimize the difference in the Q-values for each respective image triple, the loss engine(s) 160 can generate, using loss function(s) stored in the loss function(s) database 195, an RL-scene consistency loss as represented by Equation 4:

$$\mathcal{L}_{RL\text{-}scene}(G,F) = d(q_x, q_x') + d(q_x, q_x'') + (q_x', q_x'') + d(q_y, q_y') + d(q_y, q_y'') + d(q_y', q_y'')$$ (Equation 4)

where d is some distance metric. In other words, the RL-scene consistency loss uses a mean-squared error to penalize changes in Q-values across a given one of the Sim2Real2Sim and Real2Sim2Real image triples to preserve the RL-scene during adaptation.

Moreover, the Q-networks (e.g., stored in the vision-based robot task model(s) database 190), whether a single Q-network Q(s, a), or multiple Q-networks $Q_{sim}$ (s, a) and $Q_{real}$(s, a), can be trained using a standard TD-loss on all images of the Sim2Real2Sim and Real2Sim2Real image triples, $\{x, G(x), F(G(x)), \psi, F(\psi), G(F(\psi))\}$, and the loss engine(s) 160 can generate, using loss function(s) stored in the loss function(s) database 195, TD-Loss as represented generally by Equation 5:

$$\mathcal{L}_{RL}(Q) = \mathbb{E}_{(x,a)} d(Q(x,a), \text{target}_q)$$ (Equation 5)

In some implementations, the Sim2Real model of the CycleGAN model can be trained solely based on the RL-scene consistency loss. In some versions of those implementations, the Sim2Real model of the CycleGAN model can be trained based on a combination of one or more additional losses. The one or more additional losses can include the adversarial losses of each GAN of the CycleGAN, the CycleGAN consistency loss, and/or the TD-loss. Thus, the loss for training the CycleGAN model can be represented generally by Equation 6:

$$\mathcal{L}_{RL\text{-}CycleGAN}(G, F, D_X, D_Y, Q_{sim}, Q_{real}) = \mathcal{L}_{GAN}(G, D_Y) + \mathcal{L}_{GAN}(F, D_X) + \mathcal{L}_{cyc}(G, F) + \mathcal{L}_{RL\text{-}scene}(G, F,) + \mathcal{L}_{RL}(Q_{sim}) + \mathcal{L}_{RL}(Q_{real})$$ (Equation 6)

Accordingly, techniques described herein implement a CycleGAN model to mitigate the visual reality gap that is trained based on at least a loss from a vision-based robot task model, to thereby improve real-world vision-based control policies. In some implementations, by incorporating RL-scene consistency losses of a current Q-function along with CycleGAN losses, style and/or semantics of Sim2Real images can be improved for a given robotic task. For example, the CycleGAN losses can adapt a simulated image to look realistic, while the RL-scene consistency losses ensure relevant semantics of the Sim2Real images are preserved. Moreover, by training the CycleGAN model using the vision-based robot task model for a given task (and optionally joint training along with the vision-based robot task model), there is no need for generating scene segmentations masks for grasping tasks or defining a canonical scene and simulation randomization of simulated images.

Figure 2:
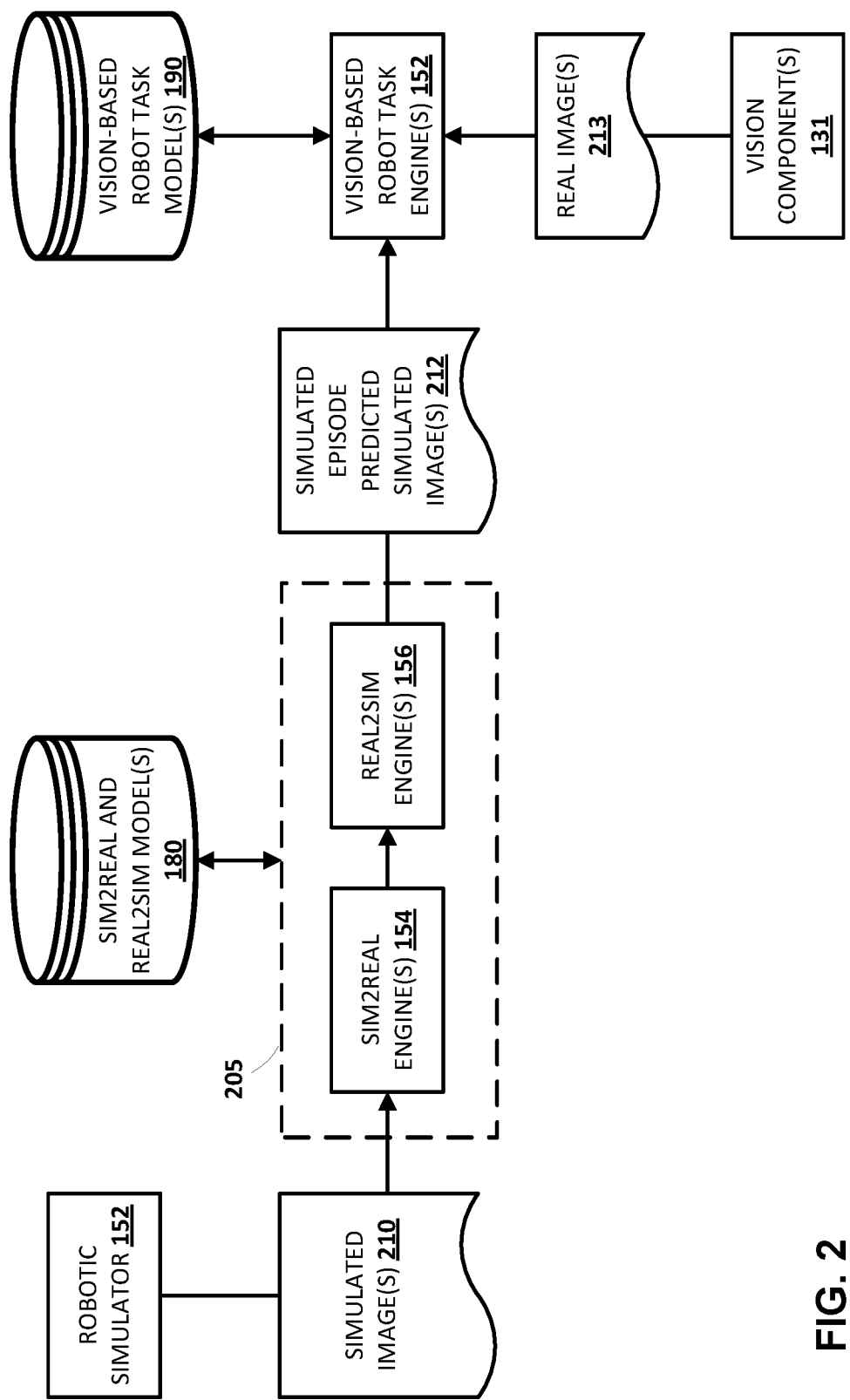
FIG. 2 is an example process flow of using a simulation-to-real model and vision-based RL task model(s) from the example training system of FIG. 1, in accordance with various implementations disclosed herein.

Turning now to FIG. 2, an example process flow of using a Sim2Real model and vision-based RL model(s) from the example training system of FIG. 1 is depicted. In some implementations, the robotic simulator 152 can generate simulated image(s) 210. The simulated image(s) 210 can be applied as input across a Sim2Real2Sim CycleGAN model 205 to generate simulated episode predicted simulated image(s) 212. More particularly, the CycleGAN model 205 can include the Sim2Real engine(s) 154 for processing the simulated image(s) 210, using Sim2Real model(s) stored in the Sim2Real and Real2Sim model(s) database 180, to generate a simulated episode predicted real image(s), and can include the Real2Sim engine(s) 156 for processing the simulated episode predicted real image(s), using Real2Sim model(s) stored in the Sim2Real and Real2Sim model(s) database 180, to generate the simulated episode predicted simulated image(s) 212.

The simulated episode predicted real image(s) and/or the simulated episode predicted simulated image(s) 212 provide more accurate representations of real world environments when compared to the raw simulated images 210 generated by the simulator 152. Moreover, when the simulated episode predicted real image(s) and/or the simulated episode predicted simulated image(s) 212 are generated using the CycleGAN model 205 that includes a Sim2Real model that is trained using the techniques described herein, styles (e.g., lighting, textures, and/or other styles) and/or semantics (e.g., objects, object pose(s), and/or other semantics) are preserved in the simulated episode predicted real image(s) and the simulated episode predicted simulated image(s) 212. Accordingly, when the CycleGAN model 205, that includes the Sim2Real model trained using the techniques described herein, is jointly trained with vision-based robot task model(s) 190, these styles and/or semantics that are preserved across the images are relevant to performance of a given simulated robotic task for which the vision-based robot task model(s) 190 are being trained. Once the Sim2Real model is trained using the techniques described herein, the vision-based robot task model(s) 190 can be further trained using the simulated episode predicted real image(s) and/or the simulated episode predicted simulated image(s) 212 that are generated using the CycleGAN model 205 that includes the trained Sim2Real model. Moreover, once the vision-based robot task model(s) 190 are further trained, the vision-based robot task model(s) 190 can be tested using real image(s) 213 that are captured by the vision component(s) 131 of robot 130 (or other vision component(s) external to robot 130). In this manner, the vision-based robot task model(s) 190 can be efficiently trained using simulated training data that preserves styles and/or semantics relevant to a given task of a real robot, thereby mitigating the visual gap and obviating the need to collect real training data, which can be an expensive and time-consuming process.

Figure 3A:
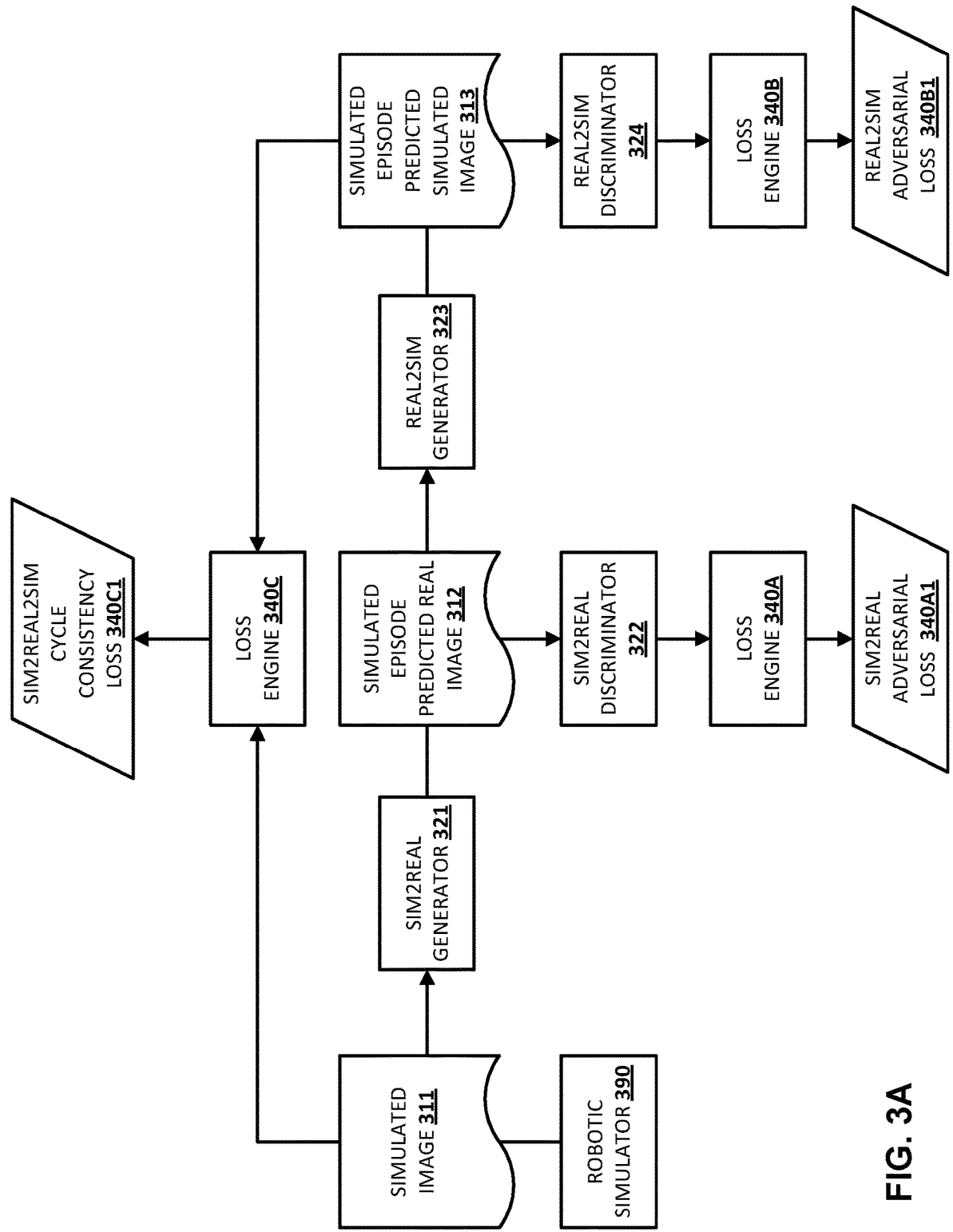
FIG. 3A is an example process flow of generating adversarial losses and a simulation-to-real-to-simulation cycle consistency loss, using a simulation-to-real-to-simulation cycle generative adversarial network model, for updating a simulation-to-real model, in accordance with various implementations.

Turning now to FIG. 3A, an example process flow of generating adversarial losses and a Sim2Real2SIm cycle consistency loss, using a Sim2Real2Sim CycleGAN model, for updating a Sim2Real model is depicted. In some implementations, the Sim2Real model can be a Sim2Real generator model of the Sim2Real GAN model of a Sim2Real2Sim CycleGAN model. The Sim2Real2Sim CycleGAN model can also include a Real2Sim GAN model. Further, each of the GAN models of the Sim2Real2Sim CycleGAN model can include corresponding generator models and discriminator models. In some versions of those implementations, the Sim2Real model can be trained based on adversarial losses and/or a Sim2Real2Sim cycle consistency loss of the Sim2Real2Sim CycleGAN model. For example, as shown in FIG. 3A, robotic simulator 390 (e.g., robotic simulator 152 of training system of FIG. 1 and/or other robotic simulator(s)) can generate a simulated image 311 during performance of a simulated episode of a vision-based robotic task (e.g., simulated object manipulation tasks, simulated navigational tasks, simulated path planning tasks, and/or other vision-based robotic tasks). Sim2Real generator 321 can process the simulated image 311, using Sim2Real generator model(s) (e.g., stored in the Sim2Real and Real2Sim model(s) database 180 of FIG. 1), to generate a simulated episode predicted real image 312. Sim2Real discriminator 322 can process the simulated episode predicted real image 312, using Sim2Real discriminator model(s) (e.g., stored in the Sim2Real and Real2Sim model(s) database 180 of FIG. 1), to determine whether the simulated episode predicted real image 312 is truly a real image or a simulated episode predicted real image generated by the Sim2Real generator 321. Based on this determination, loss engine 340A can generate a Sim2Real adversarial loss 340A1. Generating Sim2Real adversarial losses is described in more detail herein (e.g., with respect to FIG. 1 and Equation 1).

Further, Real2Sim generator 323 can process the simulated episode predicted real image 312, using Real2Sim generator model(s) (e.g., stored in the Sim2Real and Real2Sim model(s) database 180 of FIG. 1), to generate a simulated episode predicted simulated image 313. Real2Sim discriminator 324 can process the simulated episode predicted simulated image 313, using Real2Sim discriminator model(s) (e.g., stored in the Sim2Real and Real2Sim model(s) database 180 of FIG. 1), to determine whether the simulated episode predicted simulated image 313 is truly a simulated image or a simulated episode predicted simulated image generated by the Real2Sim generator 323. Based on this determination, loss engine 340B can generate a Real2Sim adversarial loss 340B1. Generating Real2Sim adversarial losses is also described in more detail herein (e.g., with respect to FIG. 1 and Equation 1).

Moreover, loss engine 340C can compare the simulated image 311 generated by the robotic simulator 390 to the simulated episode predicted simulated image 313 generated by the Real2Sim generator 323 to generate a Sim2Real2Sim cycle consistency loss 340C1. Generating Sim2Real2Sim cycle consistency losses is described in more detail herein (e.g., with respect to FIG. 1 and Equation 2). Notably, the simulated image 311, the simulated episode predicted real image 312, and the simulated episode predicted simulated image 313 form a Sim2Real2Sim image triple, and there should be little to no variance across the images of the Sim2Real2Sim image triple. Put another way, the Sim2Real2Sim cycle consistency loss 340C1 can be utilized to update the Sim2Real generator model 321 to ensure features of the original simulated image 311 are preserved when it is processed by the generators 321 and 323 of the Sim2Real2Sim CycleGAN model. One or more of the Sim2Real adversarial loss 340A1, the Real2Sim adversarial loss 340B1, the Sim2Real2Sim cycle consistency loss 340C1, and/or additional losses (e.g., as described with respect to FIGS. 1, 3B, 4A, and 4B) can be utilized to generate an update for a Sim2Real model utilized by Sim2Real generator 321 of the Sim2Real2Sim CycleGAN model of FIG. 3A. The update can be backpropagated across the Sim2Real2Sim CycleGAN model, thereby training the Sim2Real model during the simulated episode of the robotic task.

Figure 3B:
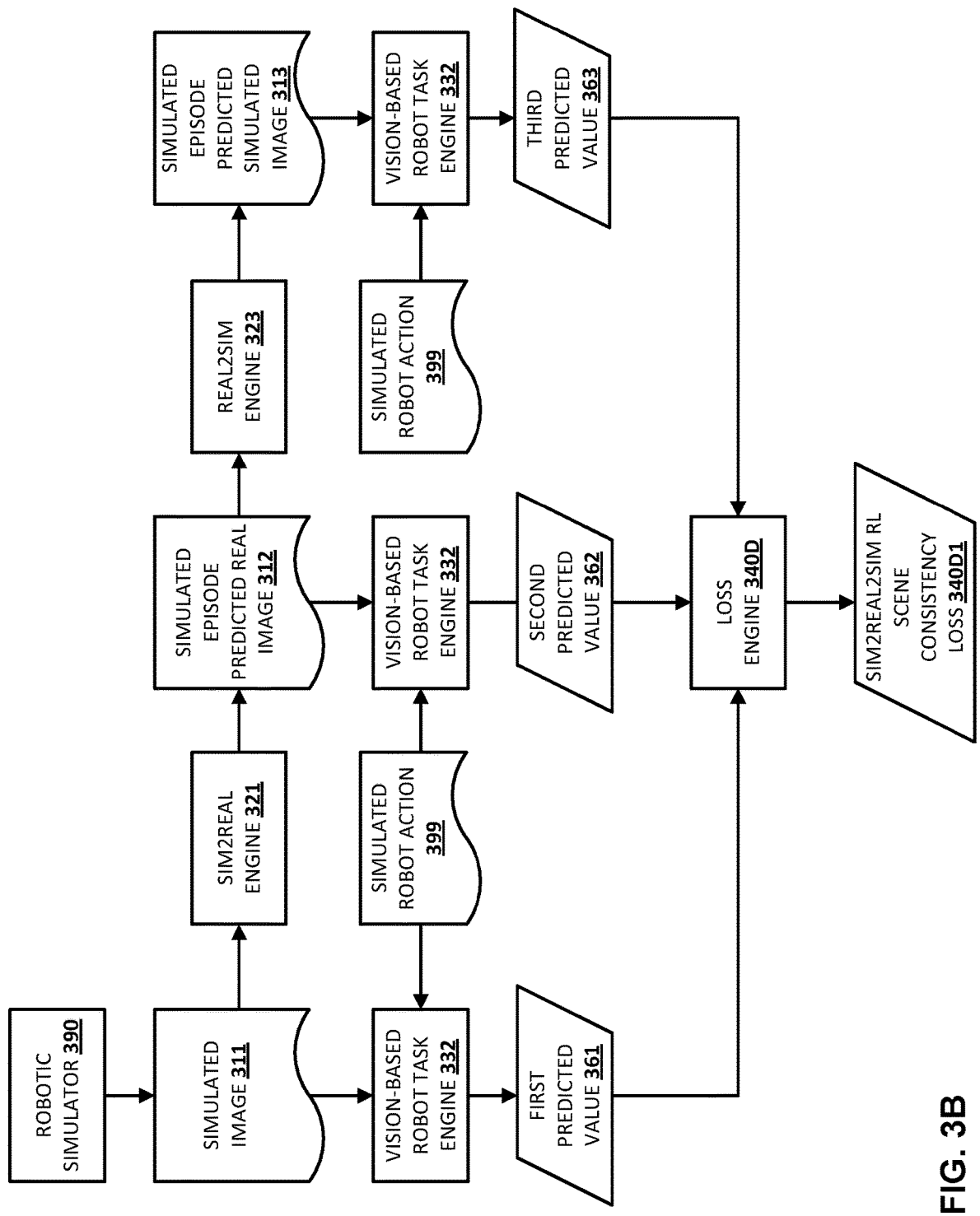
FIG. 3B is an example process flow of generating a reinforcement learning scene consistency loss, using a simulation-to-real-to-simulation cycle generative adversarial network model, for updating a simulation-to-real model, in accordance with various implementations.

In some additional and/or alternative versions of those implementations, the Sim2Real model can be trained based on additional or alternative losses. For example, as shown in FIG. 3B, an example process flow of generating an RL-scene consistency loss using a Sim2Real2Sim CycleGAN model for updating a Sim2Real model is depicted. In some versions of those implementations, the Sim2Real model can be trained based on a Sim2Real2Sim RL-scene consistently loss that is generated during the same simulated episode as FIG. 3A. Further, adversarial losses (e.g., the Sim2Real adversarial loss 340A1 and the Real2Sim adversarial loss 340B1), and a cycle consistency loss (e.g., Sim2Real2Sim cycle consistency loss 340C1) can be generated in the same manner as described above with respect to FIG. 3A. The Sim2Real model can be updated based on any one of, or any combination of, the losses described with the respect to FIGS. 3A and 3B.

For example, as shown in FIG. 3B, vision-based robot task engine 332 can process the simulated image 311 along with a simulated robot action 399 to generate a first predicted value 361, process the simulated episode predicted real image 312 along with the simulated robot action 399 to generate a second predicted value 362, and process the simulated episode predicted simulated image 313 along with the simulated robot action 399 to generate a third predicted value 363. The simulated robot action 399 can be any vision-based action that can be performed by a simulated robot during a simulated robotic task (e.g., a simulated object manipulation task, a simulated navigation task, a simulated path planning task, and/or any other simulated vision-based action). Moreover, the vision-based robot task engine 332 can process each of the images 311, 312, and 313 of the Sim2Real2Sim image triple using vision-based robot task model(s) (e.g., stored in the vision-based robot task model(s) database 190 of FIG. 1).

In some implementations, the vision-based robot task engine 332 processes each of the images 311, 312, and 313 of the Sim2Real2Sim image triple using a single vision-based robot task model, while in other implementations, the vision-based robot task engine 332 processes each of the images 311, 312, and 313 using multiple vision-based robot task models. As one non-limiting example, a first vision-based robot task model that is trained based on simulated training episodes can be utilized to process the simulated image 311 and the simulated episode predicted simulated image 313, and a second vision-based robot task model that is trained based on real training episodes can be utilized to process the simulated episode predicted real image 312. The vision-based robot task model(s) utilized by the vision-based robot task engine 332 are described in greater detail herein (e.g., with respect to FIG. 1). In some implementations, the vision-based robot task model(s) utilized by the vision-based robot task engine 332 are Q-networks and the predicted values 361, 362, and 363 are corresponding Q-values for each of the images 311, 312, and 313 of the Sim2Real2Sim image triple. The Q-networks utilized to generate the corresponding Q-values are described in greater detail above (e.g., with respect to FIG. 1).

Loss engine 340D can process the first predicted value 361, the second predicted value 362, and the third predicted value 363 to generate a Sim2Real2Sim RL-scene consistency loss 340D1. More particularly, the loss engine 340D can determine a mean-squared error based on the first predicted value 361, the second predicted value 362, and the third predicted value 363, and generate the Sim2Real2Sim RL-scene consistency loss 340D1 as a function of these errors. Generating the Sim2Real2Sim RL-scene consistency loss 340D1 is described in greater detail above (e.g., with respect to FIG. 1 and Equation 4). Further, and although not depicted in FIG. 3B, a temporal difference ("TD") loss can be generated based on the processing by the vision-based robot task engine 332 as described in greater detail above (e.g., with respect to FIG. 1 and Equation 5). The Sim2Real2Sim RL-scene consistency loss 340D1 and/or the TD loss can be utilized in generating an update that is backpropagated across the Sim2Real2Sim CycleGAN model of FIG. 3B, thereby training the Sim2Real model during the simulated episode of the robotic task.

In this manner, the Real2Sim2Real cycle consistency loss 440C1 can be utilized to update the Sim2Real generator model 423 to ensure features of the original real image 411 are preserved when it is processed by the generators 321 and 323 of the Sim2Real2Sim CycleGAN model, and that the features that are preserved are relevant to the simulated task being performed during the simulated episode, such that the trained Sim2Real model is task-aware. Moreover, the update utilized to train the Sim2Real model can be based on one of, a subset of, and/or all of the losses described herein with respect to FIGS. 3A, 2B, 4A, and 4B. Although each of the loss engines 340A, 340B, 340C, and 340D are depicted as distinct loss engines, it should be understood that is for the sake of example, and that the loss engines 340A, 340B, 340C, and 340D can be a single loss engine and/or distinct loss engines.

Figure 4A:
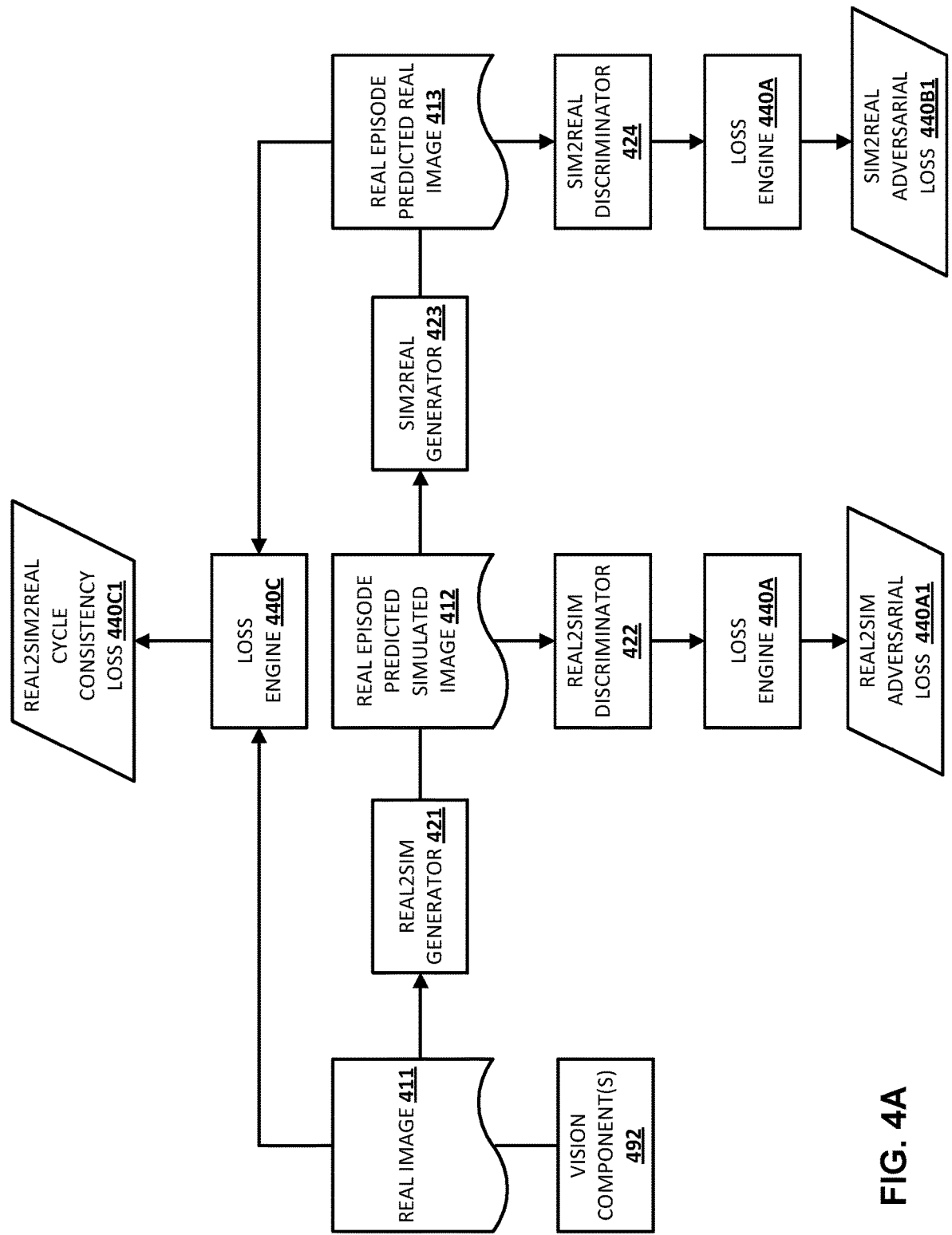
FIG. 4A is an example process flow of generating adversarial losses and a real-to-simulation-to-real cycle consistency loss, using a real-to-simulation-to-real cycle generative adversarial network model, for updating a simulation-to-real model, in accordance with various implementations.

Turning now to FIG. 4A, an example process flow of generating adversarial losses and a Real2Sim2Real cycle consistency loss using a Real2Sim2Real CycleGAN model for updating a Sim2Real model is depicted. In some implementations, the Sim2Real model can be a Sim2Real generator model of the Sim2Real GAN model of a Real2Sim2Real CycleGAN model. The Real2Sim2Real CycleGAN model can also include a Real2Sim GAN model. Further, each of the GAN models of the Real2Sim2Real CycleGAN model can include corresponding generator models and discriminator models. In some versions of those implementations, the Sim2Real model can be trained based on adversarial losses and/or a Real2Sim2Real cycle consistency loss of the Real2Sim2Real CycleGAN model. For example, as shown in FIG. 4A, vision component(s) 492 (e.g., vision component(s) 131 of robot 130 of FIG. 1 and/or other vision component(s)) can generate a real image 411 during performance of a real episode of a vision-based robotic task (e.g., real object manipulation tasks, real navigational tasks, real path planning tasks, and/or other vision-based robotic tasks). Real2Sim generator 421 can process the real image 411, using Real2Sim generator model(s) (e.g., stored in the Sim2Real and Real2Sim model(s) database 180 of FIG. 1), to generate a real episode predicted simulated image 412. Real2Sim discriminator 422 can process the real episode predicted simulated image 312, using Real2Sim discriminator model(s) (e.g., stored in the Sim2Real and Real2Sim model(s) database 180 of FIG. 1), to determine whether the real episode predicted simulated image 312 is truly a simulated image or a real episode predicted simulated image generated by the Real2Sim generator 421. Based on this determination, loss engine 440A can generate a Real2Sim adversarial loss 440A1. Generating Real2Sim adversarial losses is described in more detail herein (e.g., with respect to FIG. 1 and Equation 1).

Further, Sim2Real generator 423 can process the real episode predicted simulated image 412, using Sim2Real generator model(s) (e.g., stored in the Sim2Real and Real2Sim model(s) database 180 of FIG. 1), to generate a real episode predicted real image 413. Sim2Real discriminator 424 can process the real episode predicted real image 413, using Sim2Real discriminator model(s) (e.g., stored in the Sim2Real and Real2Sim model(s) database 180 of FIG. 1), to determine whether the real episode predicted real image 413 is truly a real image or a real episode predicted real image generated by the Sim2Real generator 423. Based on this determination, loss engine 440B can generate a Sim2Real adversarial loss 440B1. Generating Sim2Real adversarial losses is also described in more detail herein (e.g., with respect to FIG. 1 and Equation 1).

Moreover, loss engine 440C can compare the real image 411 generated by the vision component(s) 492 to the real episode predicted real image 413 generated by the Sim2Real generator 423 to generate a Real2Sim2Real cycle consistency loss 440C1. Generating Real2Sim2Real cycle consistency losses is described in more detail herein (e.g., with respect to FIG. 1 and Equation 2). Notably, the real image 411, the real episode predicted simulated image 412, and the real episode predicted real image 413 form a Real2Sim2Real image triple, and there should be little to no variance across the images of the Real2Sim2Real image triple. Put another way, the Real2Sim2Real cycle consistency loss 440C1 can be utilized to update the Sim2Real generator model 423 to ensure features of the original real image 411 are preserved when it is processed by the generators 421 and 423 of the Real2Sim2Real CycleGAN model. One or more of the Real2Sim adversarial loss 440A1, the Sim2Real adversarial loss 440B1, the Real2Sim2Real cycle consistency loss 440C1, and/or additional losses (e.g., as described with respect to FIGS. 1, 3A, 3B and 4B) can be utilized to generate an update for a Sim2Real model utilized by Sim2Real generator 423 of the Real2Sim2Real CycleGAN model of FIG. 4A. The update can be backpropagated across the Real2Sim2Real CycleGAN model, thereby training the Sim2Real generator 423 of the Real2Sim2Real CycleGAN model of FIG. 4A during the real episode of the robotic task.

Figure 4B:
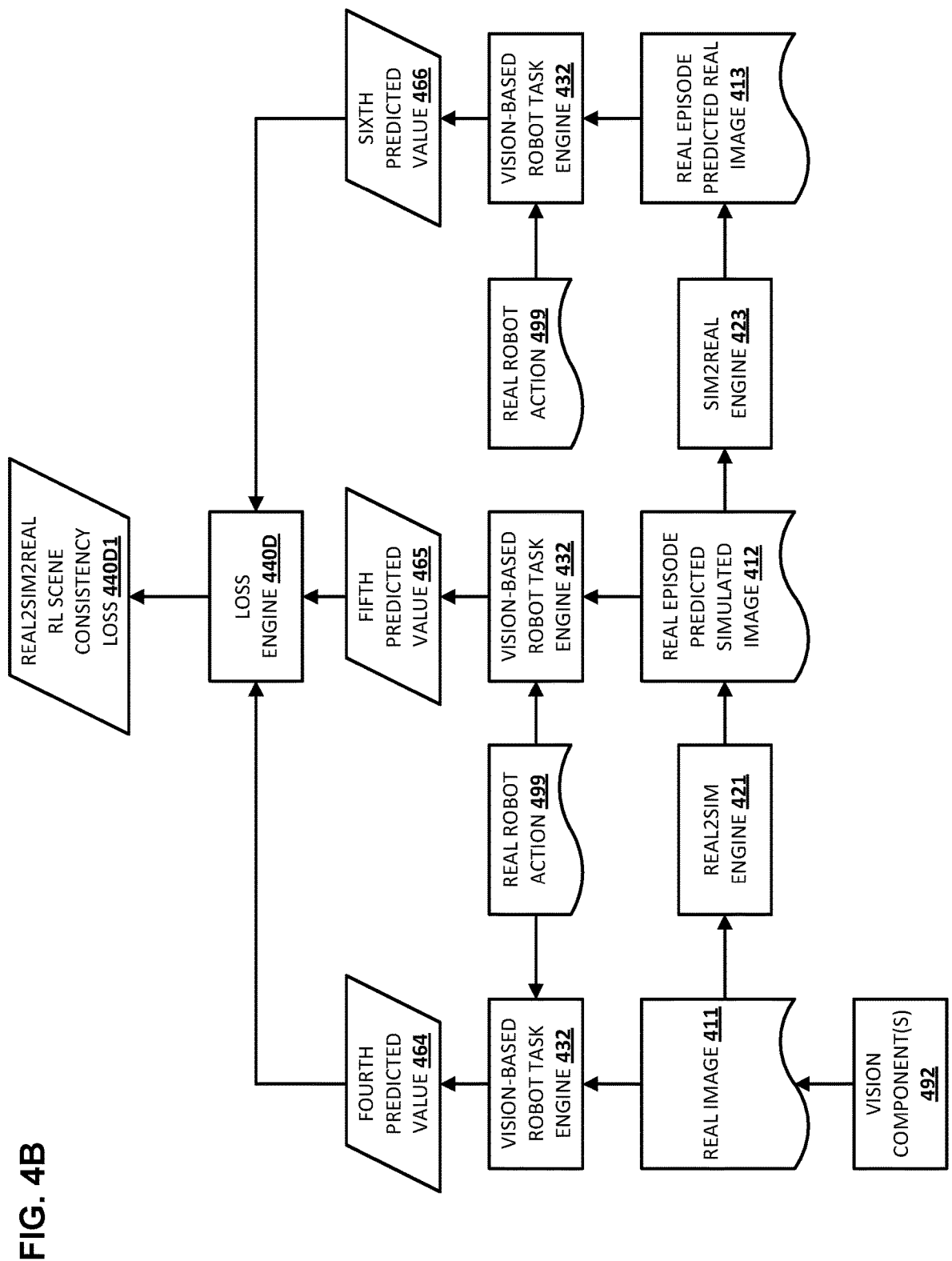
FIG. 4B is an example process flow of generating a reinforcement learning scene consistency loss, using a real-to-simulation-to-real cycle generative adversarial network model, for updating a simulation-to-real model, in accordance with various implementations.

In some additional and/or alternative versions of those implementations, the Sim2Real model can be trained based on additional or alternative losses. For example, as shown in FIG. 4B, an example process flow of generating an RL-scene consistency loss using a Sim2Real2Sim CycleGAN model for updating a Sim2Real model is depicted. In some versions of those implementations, the Sim2Real model can be trained based on a Real2Sim2Real RL-scene consistently loss, and can be generated during the same simulated episode FIG. 4A. Further, adversarial losses (e.g., the Real2Sim adversarial loss 440A1 and the Sim2Real adversarial loss 440B1), and a cycle consistency loss (e.g., Real2Sim2Real cycle consistency loss 440C1) can be generated in the same manner as described above with respect to FIG. 4A. The Sim2Real model can be updated based on any one of, or any combination of, the losses described with the respect to FIGS. 3A, 3B, 4A, and 3B.

For example, as shown in FIG. 4B, vision-based robot task engine 432 can process the real image 411 along with a real robot action 499 to generate a fourth predicted value 464, process the real episode predicted simulated image 412 along with the real robot action 499 to generate a fifth predicted value 465, and process the real episode predicted real image 413 along with the simulated robot action 499 to generate a sixth predicted value 466. The real robot action 499 can be any vision-based action that can be performed by a real robot during a real robotic task (e.g., a real object manipulation task, a real navigation task, a real path planning task, and/or any other real vision-based action). Moreover, the vision-based robot task engine 432 can process each of the images 411, 412, and 413 of the Real2Sim2Real image triple using vision-based robot task model(s) (e.g., stored in the vision-based robot task model(s) database 190 of FIG. 1).

In some implementations, the vision-based robot task engine 432 processes each of the images 311, 412, and 413 of the Real2Sim2Sim image triple using a single vision-based robot task model, while in other implementations, the vision-based robot task engine 432 processes each of the images 411, 412, and 413 using multiple vision-based robot task models. As one non-limiting example, a first vision-based robot task model that is trained based on real training episodes can be utilized to process the real image 411 and the real episode predicted real image 413, and a second vision-based robot task model that is trained based on simulated training episodes can be utilized to process the real episode predicted simulated image 412. The vision-based robot task model(s) utilized by the vision-based robot task engine 432 are described in greater detail herein (e.g., with respect to FIG. 1). In some implementations, the vision-based robot task model(s) utilized by the vision-based robot task engine 432 are Q-networks, and the predicted values 464, 465, and 466 are corresponding Q-values for each of the images 411, 412, and 413 of the Real2Sim2Real image triple. The Q-functions utilized to generate the corresponding Q-values are described in greater detail above (e.g., with respect to FIG. 1).

Loss engine 440D can process the fourth predicted value 461, the fifth predicted value 465, and the sixth predicted value 466 to generate a Real2Sim2Real RL-scene consistency loss 440D1. More particularly, the loss engine 440D can determine a mean-squared error based on the fourth predicted value 461, the fifth predicted value 465, and the sixth predicted value 466, and generate the Real2Sim2Real RL-scene consistency loss 440D1 as a function of these errors. Generating the Real2Sim2Real RL-scene consistency loss 440D1 is described in greater detail above (e.g., with respect to FIG. 1 and Equation 4). Further, and although not depicted in FIG. 4B, a temporal difference ("TD") loss can be generated based on the processing by the vision-based robot task engine 432 as described in greater detail above (e.g., with respect to FIG. 1 and Equation 5). The Real2Sim2Sim RL-scene consistency loss 440D1 and/or the TD loss can be utilized in generating an update that is backpropagated across the Real2Sim2Real CycleGAN model of FIG. 4B, thereby training the Sim2Real model during the real episode of the robotic task.

In this manner, the Real2Sim2Real cycle consistency loss 440C1 can be utilized to update the Sim2Real generator model 423 to ensure features of the original real image 411 are preserved when it is processed by the generators 421 and 423 of the Sim2Real2Sim CycleGAN model, and that the features that are preserved are relevant to the simulated task being performed during the simulated episode, such that the trained Sim2Real model is task-aware. Moreover, the update utilized to train the Sim2Real model can be based on one of, a subset of, and/or all of the losses described herein with respect to FIGS. 4A and 4B. Although each of the loss engines 440A, 440B, 440C, and 440D are depicted as distinct loss engines, it should be understood that is for the sake of example, and that the loss engines 440A, 440B, 440C, and 440D can be a single loss engine and/or distinct loss engines.

Moreover, the Sim2Real and Real2Sim models of FIGS. 3A, 3B, 4A, and 4B can be the same models, and one or more of the losses generated using the process flows of FIGS. 3A, 3B, 4A, and 4B can be utilized to update the Sim2Real model. In some implementations, simulated episodes and real episodes of a robotic task can be performed in parallel. For example, three predicted values can be generated during a simulated robotic task as described with respect to FIG. 3B, and three additional predicted values can be generated during a real robotic task as described with respect to FIG. 4B. In this example, a RL-scene consistency loss can be generated as a function of the six predicted values (e.g., as described with respect to FIG. 1 and Equation 4). The Sim2Real model can be updated based on the RL-scene consistency loss, and optionally one or more of the additional losses described herein. In some additional and/or alternative implementations, the Sim2Real model may be trained mostly using simulated episodes or real episodes of a robotic task. In implementations where the Sim2Real model is trained mostly (or even exclusively) on the simulated episodes of the robotic task, the RL-scene consistency loss may be a Sim2Real2Sim RL consistency loss that is generating the update for the Sim2Real model as described with respect to FIG. 3B. In implementations where the Sim2Real model is trained mostly (or even exclusively) on the real episodes of the robotic task, the RL-scene consistency loss may be a Real2Sim2Real RL consistency loss that is generating the update for the Sim2Real model as described with respect to FIG. 4B.

Figure 5:
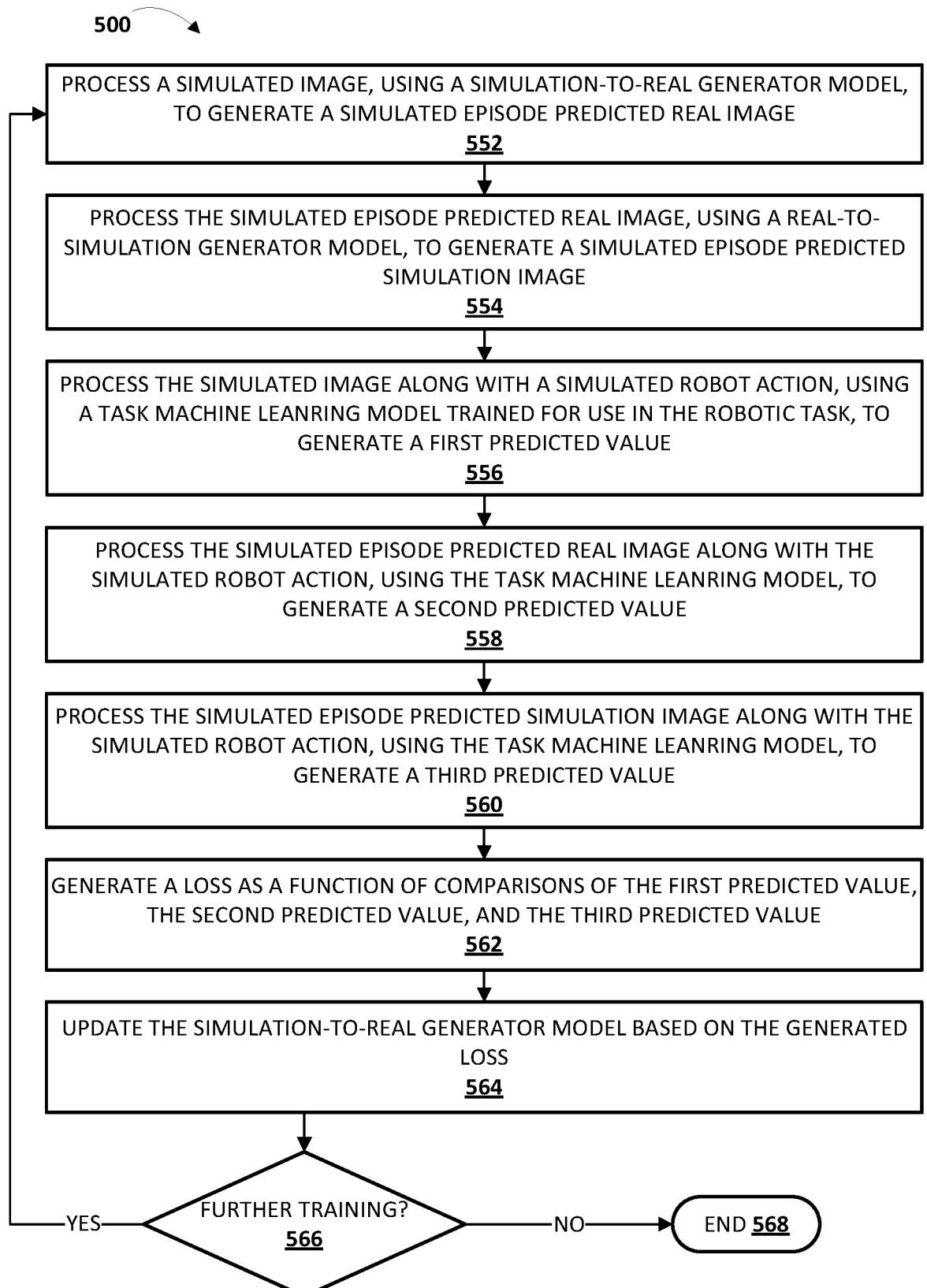
FIG. 5 is a flowchart illustrating an example method of using a reinforcement learning scene consistency loss to update a simulation-to-real model, in accordance with various implementations disclosed herein.

Turning now to FIG. 5, a flowchart illustrating an example method 500 of training a Sim2Real model according to various implementations disclosed herein. For convenience, the operations of the flow chart are described with reference to a system that performs the operations. This system may include one or more processors, such as processor(s) of robot 130 of FIG. 1 and/or robot 620 of FIG. 6, processor(s) 714 of computing device of FIG. 7, and/or other processor(s). While operations of method 500 are shown in a particular order, this is not meant to be limiting. One or more operations may be reordered, omitted, or added.

At block 552, the system processes a simulated image, using a simulation-to-real generator model, to generate a simulated episode predicted real image. The simulated image can be generated by a robotic simulator during a simulated episode of a simulated robot attempting performance of a robotic task. Further, the simulated episode predicted real image corresponds to the simulated image. For example, the simulated image can include a simulated robotic arm attempting to perform a simulated object manipulation task, such as a simulated grasping task. As another example, the simulated image can include a simulated environment that is to be navigated by a simulated robot during a simulated navigational task. Moreover, in some implementations, the simulated episode predicted real image can be evaluated by a simulation-to-real discriminator model that predicts whether the simulated episode predicted real image is actually a real image or a simulated episode predicted real image that is generated by the simulation-to-real generator model. A simulation-to-real adversarial loss can be generated based on this prediction by the simulation-to-real discriminator model.

At block 554, the system processes the simulated episode predicted real image, using a real-to-simulation generator model, to generate a simulated episode predicted simulation image. The simulated episode predicted simulation image corresponds to the simulated episode predicted real image, and, as a result, also corresponds to the simulated image. Moreover, in some implementations, the simulated episode predicted simulation image can be evaluated by a real-to-simulator discriminator model that predicts whether the simulated episode predicted simulation image is actually a simulated image or a simulated episode predicted simulation image that is generated by the real-to-simulation generator model. A real-to-simulation adversarial loss can be generated based on this prediction by the real-to-simulation discriminator model. Further, a cycle loss can be determined based on comparing the simulated image originally processed by the simulation-to-real generator model and the simulated episode predicted simulation image. The result of the processing in blocks 552 and 554 is an image triple of [simulated image, simulated episode predicted real image, simulated episode predicted simulation image].

At block 556, the system processes the simulated image along with a simulated robot action, using a task machine learning mode trained for use in the robotic task, to generate a first predicted value. In some implementations, the first predicted value is generated by applying the simulated image along with a simulated robot action as input across a value-network. In some other implementations, the first predicted value is a first Q-value generated by applying the simulated image along with a simulated robot action as input across a Q-network.

At block 558, the system processes the simulated episode predicted real image along with the simulated robot action, using the task machine learning model, to generate a second predicted value. In some implementations, the second predicted value is generated by applying the simulated image along with a simulated robot action as input across a value-network. In some other implementations, the second predicted value is a second Q-value generated by applying the simulated image along with a simulated robot action as input across a Q-network.

At block 560, the system processes the simulated episode predicted simulation image along with the simulated robot action, using the task machine learning model, to generate a third predicted value. In some implementations, the third predicted value is generated by applying the simulated image along with a simulated robot action as input across a value-network. In some other implementations, the third predicted value is a third Q-value generated by applying the simulated image along with a simulated robot action as input across a Q-network.

At block 562, the system generates a loss as a function of comparisons of the first predicted value, the second predicted value, and the third predicted value. These comparisons comprise three comparisons between unique pairs of the first predicted value, the second predicted value, and the third predicted value (e.g., [first predicted value, second predicted value], [first predicted value, third predicted value], and [second predicted value, third predicted value]). By comparing these unique pairs of predicted values, a variance across the first predicted value, the second predicted value, and the third predicted value can be determined. The loss generated at block 562 can be generated as a function of the variance. Again, because each image in the image triple of [simulated image, simulated episode predicted real image, simulated episode predicted simulation image] represents the same scene, ideally there is little to no variance in these predicted values.

At block 564, the system updates the simulation-to-real model based on the generated loss. The system can update the simulation-to-real model by backpropogating the generated loss across the simulation-to-real model. In some implementations, one or more additional losses can also be backpropagated across the simulation-to-real model. The one or more additional losses can include the simulation-to-real adversarial loss from block 552, the real-to-simulation adversarial loss from block 554, the cycle loss from block 554, and/or other losses. The various losses can be backpropagated individually, or combined into a single loss (e.g., a loss function that itself is a function of the various losses).

At block 566, the system determines whether to perform further training on the simulation-to-real model. If, at an iteration of block 566, the system determines to perform further training on the simulation-to-real model, then the system returns to block 552 to process an additional simulated image. If, at an iteration of block 566, the system determines not to perform further training on the simulation-to-real model, then the system proceeds to block 568 and training of the simulation-to-real model ends.

By training the simulation-to-real model based on the generated loss from the task machine learning model, the simulation-to-real model can more accurately real-world environments and be tailored for a given task of the task machine learning model. The given task of the task machine learning model may be based on the simulated robot actions used to generate the predicted values. Accordingly, a given simulation-to-real generator model can be tailored to a given robotic task, and various semantics (e.g., objects, robot pose(s), and/or other semantics) and/or styles (e.g., lighting, textures, and/or other styles) can be preserved when policies generated in simulation are transferred to real robots that operate in real-world environments.

Figure 6:
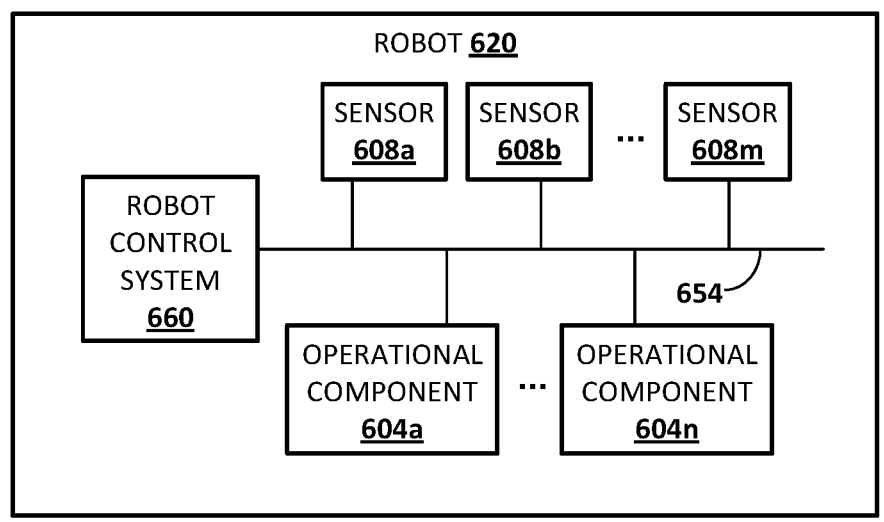
FIG. 6 schematically depicts an example architecture of a robot, in accordance with various implementations disclosed herein.

FIG. 6 schematically depicts an example architecture of a robot 620. The robot 620 includes a robot control system 660, one or more operational components 604*a-n*, and one or more sensors 608*a-m*. The sensors 608*a-m* may include, for example, vision sensors (e.g., camera(s), 3D scanners), light sensors, pressure sensors, positional sensors, pressure wave sensors (e.g., microphones), proximity sensors, accelerometers, gyroscopes, thermometers, barometers, and so forth. While sensors 608*a-m* are depicted as being integral with robot 620, this is not meant to be limiting. In some implementations, sensors 608*a-m* may be located external to robot 620, e.g., as standalone units.

Operational components 604*a-n* may include, for example, one or more end effectors (e.g., grasping end effectors) and/or one or more servo motors or other actuators to effectuate movement of one or more components of the robot. For example, the robot 620 may have multiple degrees of freedom and each of the actuators may control actuation of the robot 620 within one or more of the degrees of freedom responsive to control commands provided by the robot control system 660 (e.g., torque and/or other commands generated based on a control policy). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 204*a-n*, with each of the real time bursts comprising a set of one or more control commands that dictate, inter alia, the parameters of motion (if any) for each of one or more of the operational components 604*a-n*. In various implementations, the control commands can be at least selectively generated by the control system 660 based at least in part on selected robot actions and/or other determination(s) made using a machine learning model that is stored locally on the robot 620 and that is trained according to implementations described herein.

Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710 of FIG. 7.

Figure 7:
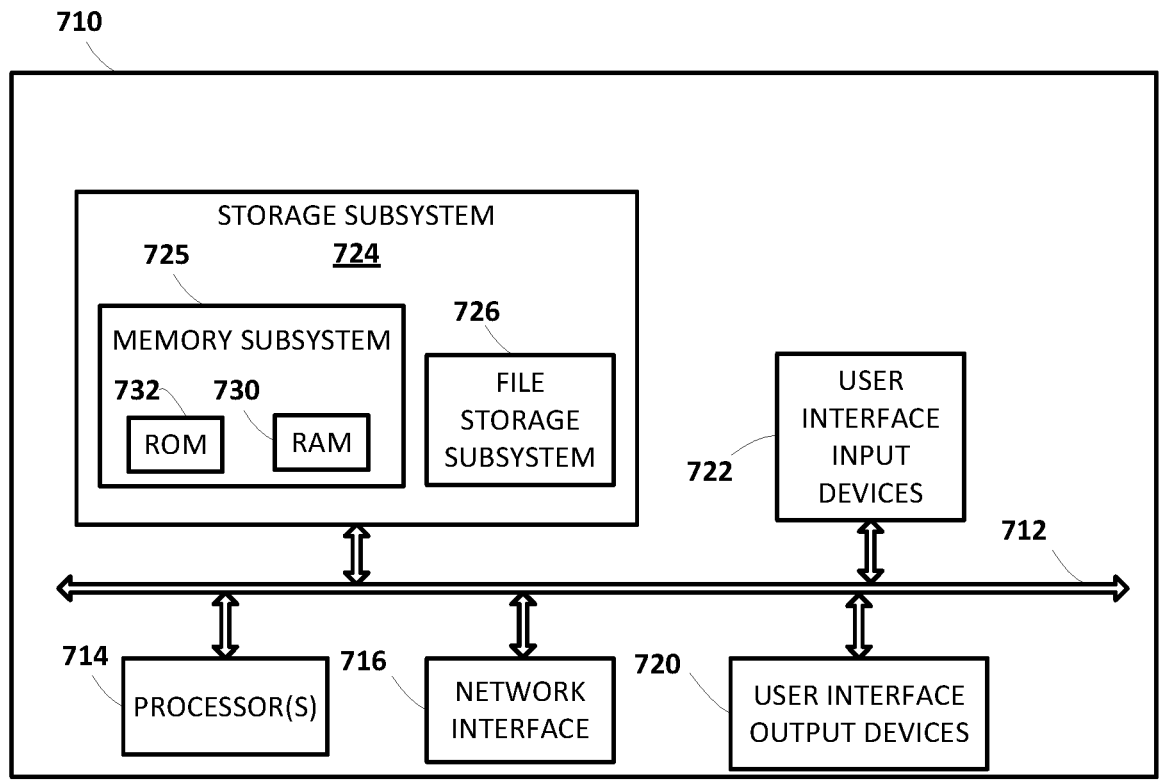
FIG. 7 schematically depicts an example architecture of a computer system, in accordance with various implementations disclosed herein.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

What is claimed is:

1. A method implemented by one or more processors, the method comprising:
processing a simulated image, using a simulation-to-real generator model, to generate a simulated episode predicted real image,
wherein the simulated image is generated by a robotic simulator during a simulated episode of a simulated robot attempting performance of a robotic task;
processing the simulated episode predicted real image, using a real-to-simulation generator model, to generate a simulated episode predicted simulation image;
processing the simulated image along with a simulated robot action, using a task machine learning model being trained for use in the robotic task, to generate a first predicted value;
processing the simulated episode predicted real image along with the simulated robot action, using the task machine learning model, to generate a second predicted value;
processing the simulated episode predicted simulated image along with the simulated robot action, using the task machine learning model, to generate a third predicted value;
generating a loss as a function of comparisons of the first predicted value, the second predicted value, and the third predicted value; and
updating the simulation-to-real generator model based on the generated loss.

2. The method of claim 1, further comprising:
processing a real image, using the real-to-simulation generator model, to generate a real episode predicted simulation image,
wherein the real image is captured by a real camera, associated with a real robot, during a real episode of the real robot attempting performance of the robotic task;
processing the real episode predicted simulation image, using the simulation-to-real generator model, to generate a real episode predicted real image;
processing the real image along with a real robot action, using the task machine learning model or an additional task machine learning model being trained for use in the robotic task, to generate a fourth predicted value;
processing the real episode predicted simulated image along with the real robot action, using the task machine learning model or the additional task machine learning model, to generate a fifth predicted value; and
processing the real episode predicted real image along with the real robot action, using the task machine learning model or the additional task machine learning model, to generate a sixth predicted value,
wherein generating the loss is further a function of additional comparisons of the fourth predicted value, the fifth predicted value, and the sixth predicted value.

3. The method of claim 2, wherein the comparisons of the first predicted value, the second predicted value, and the third predicted value comprise three comparisons, each of the three comparisons being between a unique pair of the first predicted value, the second predicted value, and the third predicted value.

4. The method of claim 3, wherein the additional comparisons of the fourth predicted value, the fifth predicted value, and the sixth predicted value comprise three additional comparisons, each of the three additional comparisons being between a unique pair of the fourth predicted value, the fifth predicted value, and the sixth predicted value.

5. The method of claim 2, wherein generating the loss is further a function of an adversarial loss and/or a cycle consistency loss, wherein the adversarial loss and the cycle consistency loss are both generated independent of any outputs generated using the task machine learning model or the additional task machine learning model.

6. The method of claim 5,
wherein the adversarial loss is generated based on whether a simulation-to-real discriminator model predicts the predicted real image is an actual real image or the predicted real image generated by the simulation-to-real generator, and wherein the cycle consistency loss is generated based on comparison of the simulated image and the simulated episode predicted simulation image.

7. The method of claim 6, wherein generating the loss is further a function of both the adversarial loss and the cycle consistency loss.

8. The method of claim 1, wherein the task machine learning model represents a Q-function, wherein the task machine learning model is being trained during reinforcement learning based on the simulated episode and additional simulated episodes, and wherein the first predicted value is a first Q-value, the second predicted value is a second Q-value, and the third predicted value is a third Q-value.

9. The method of claim 1, further comprising:
generating a task machine learning model loss based on the second predicted value; and
updating the task machine learning model based on the task machine learning model loss.

10. The method of claim 9, wherein generating the task machine learning model loss is independent of at least the first predicted value and the third predicted value.

11. The method of claim 1, wherein the simulated episode is an offline episode.

12. The method of claim 1, wherein the simulated episode is an online episode.

13. The method of claim 1, wherein the robotic task is an object manipulation task or a navigation task.

14. The method of claim 13, wherein the robotic task is the object manipulation task, and wherein the object manipulation task is a grasping task.

15. A system comprising:
at least one processor; and
memory storing instructions that, when executed by the at least one processor, cause the at least one processor to be operable to:
process a simulated image, using a simulation-to-real generator model, to generate a simulated episode predicted real image,
wherein the simulated image is generated by a robotic simulator during a simulated episode of a simulated robot attempting performance of a robotic task;
process the simulated episode predicted real image, using a real-to-simulation generator model, to generate a simulated episode predicted simulation image;
process the simulated image along with a simulated robot action, using a task machine learning model being trained for use in the robotic task, to generate a first predicted value;
process the simulated episode predicted real image along with the simulated robot action, using the task machine learning model, to generate a second predicted value;
process the simulated episode predicted simulated image along with the simulated robot action, using the task machine learning model, to generate a third predicted value;
generate a loss as a function of comparisons of the first predicted value, the second predicted value, and the third predicted value; and
update the simulation-to-real generator model based on the generated loss.

16. The system of claim 15, wherein the at least one processor is further operable to:
process a real image, using the real-to-simulation generator model, to generate a real episode predicted simulation image,
wherein the real image is captured by a real camera, associated with a real robot, during a real episode of the real robot attempting performance of the robotic task;
process the real episode predicted simulation image, using the simulation-to-real generator model, to generate a real episode predicted real image;
process the real image along with a real robot action, using the task machine learning model or an additional task machine learning model being trained for use in the robotic task, to generate a fourth predicted value;
process the real episode predicted simulated image along with the real robot action, using the task machine learning model or the additional task machine learning model, to generate a fifth predicted value; and
process the real episode predicted real image along with the real robot action, using the task machine learning model or the additional task machine learning model, to generate a sixth predicted value,
wherein generating the loss is further a function of additional comparisons of the fourth predicted value, the fifth predicted value, and the sixth predicted value.

17. The system of claim 15, wherein the comparisons of the first predicted value, the second predicted value, and the third predicted value comprise three comparisons, each of the three comparisons being between a unique pair of the first predicted value, the second predicted value, and the third predicted value.

18. The system of claim 15, wherein the at least one processor is further operable to:
generate a task machine learning model loss based on the second predicted value; and
update the task machine learning model based on the task machine learning model loss.

19. A non-transitory computer-readable storage medium storing instructions that, when executed by at least one processor, cause the at least one processor to perform operations, the operations comprising:
processing a simulated image, using a simulation-to-real generator model, to generate a simulated episode predicted real image,
wherein the simulated image is generated by a robotic simulator during a simulated episode of a simulated robot attempting performance of a robotic task;
processing the simulated episode predicted real image, using a real-to-simulation generator model, to generate a simulated episode predicted simulation image;

processing the simulated image along with a simulated robot action, using a task machine learning model being trained for use in the robotic task, to generate a first predicted value;

processing the simulated episode predicted real image along with the simulated robot action, using the task machine learning model, to generate a second predicted value;

processing the simulated episode predicted simulated image along with the simulated robot action, using the task machine learning model, to generate a third predicted value;

generating a loss as a function of comparisons of the first predicted value, the second predicted value, and the third predicted value; and updating the simulation-to-real generator model based on the generated loss.

* * * * *